(12) United States Patent
Ha et al.

(10) Patent No.: US 12,481,199 B2
(45) Date of Patent: Nov. 25, 2025

(54) ELECTRONIC DEVICE FOR ADJUSTING LIGHT TRANSMITTANCE OF TINTABLE LENS AND METHOD FOR CONTROLLING THE SAME

(71) Applicant: Samsung Electronics Co., Ltd., Suwon-si (KR)

(72) Inventors: Heonjun Ha, Suwon-si (KR); Chulkwi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 17/952,797

(22) Filed: Sep. 26, 2022

(65) Prior Publication Data

US 2023/0096399 A1 Mar. 30, 2023

Related U.S. Application Data

(63) Continuation of application No. PCT/KR2022/014107, filed on Sep. 21, 2022.

(30) Foreign Application Priority Data

Sep. 27, 2021 (KR) ........................ 10-2021-0127508

(51) Int. Cl.
*G02F 1/23* (2006.01)
*G02B 7/00* (2021.01)
(Continued)

(52) U.S. Cl.
CPC ............... *G02F 1/23* (2013.01); *G02B 7/003* (2013.01); *G02B 27/0172* (2013.01);
(Continued)

(58) Field of Classification Search
CPC ....... G02F 1/23; G02B 7/003; G02B 27/0172; G02B 2027/0112; G02B 2027/0118; G02B 2027/0138; G02B 2027/0178; H02J 50/10
See application file for complete search history.

(56) References Cited

U.S. PATENT DOCUMENTS

2015/0049378 A1 2/2015 Shrivastava et al.
2015/0138224 A1 5/2015 Kim et al.
(Continued)

FOREIGN PATENT DOCUMENTS

CN 110221436 A * 9/2019 ........... G02B 27/017
CN 113189796 A * 7/2021 ............... G02C 9/00
(Continued)

OTHER PUBLICATIONS

International Search report dated Jan. 2, 2023, issued in International Patent Application No. PCT/KR2022/014107.

*Primary Examiner* — Collin X Beatty
(74) *Attorney, Agent, or Firm* — Jefferson IP Law, LLP

(57) ABSTRACT

An electronic device is provided. The electronic device includes a first transparent member and a second transparent member where at least one visual object is displayed, a lens frame receiving at least a portion of the first transparent member and at least a portion of the second transparent member, the lens frame configured to: allow an external electronic device including at least one color-changeable lens to be attached thereto, and allow the at least one color-changeable lens to be aligned with at least one of the
(Continued)

first transparent member or the second transparent member if the external electronic device is attached to the lens frame, one or more wearing members extending from the lens frame or coupled to the lens frame, at least one camera disposed in the lens frame and at least partially exposed to an outside through at least one hole formed in the lens frame, at least one first transmission coil disposed adjacent to at least a portion of the at least one camera inside the lens frame, and a power transmission circuit configured to transfer a current to the at least one first transmission coil.

20 Claims, 18 Drawing Sheets

(51) Int. Cl.
    *G02B 27/01*     (2006.01)
    *H02J 50/10*     (2016.01)
(52) U.S. Cl.
    CPC ............ *G02B 2027/0112* (2013.01); *G02B 2027/0118* (2013.01); *G02B 2027/0138* (2013.01); *G02B 2027/0178* (2013.01); *H02J 50/10* (2016.02)

(56) References Cited

U.S. PATENT DOCUMENTS

| | | |
|---|---|---|
| 2017/0199396 A1 | 7/2017 | Knoll |
| 2018/0129112 A1 | 5/2018 | Osterhout |
| 2018/0203260 A1 | 7/2018 | Blum |
| 2018/0348524 A1 | 12/2018 | Blum et al. |
| 2021/0311332 A1 | 10/2021 | Lee |
| 2024/0248374 A1* | 7/2024 | Han .................. G02F 1/163 |

FOREIGN PATENT DOCUMENTS

| | | |
|---|---|---|
| CN | 215953975 U | 3/2022 |
| JP | 2018-534606 A | 11/2018 |
| JP | 2020-060768 A | 4/2020 |
| JP | 2020-523628 A | 8/2020 |
| KR | 10-1091783 B1 | 12/2011 |
| KR | 10-2015-0057122 A | 5/2015 |
| KR | 10-2018-0052653 A | 5/2018 |
| KR | 10-2008296 B1 | 8/2019 |
| KR | 10-2065767 B1 | 1/2020 |
| KR | 10-2020-0106871 A | 9/2020 |
| KR | 10-2021-0004776 A | 1/2021 |

* cited by examiner

ELECTRONIC DEVICE FOR ADJUSTING LIGHT TRANSMITTANCE OF TINTABLE LENS AND METHOD FOR CONTROLLING THE SAME

CROSS-REFERENCE TO RELATED APPLICATION(S)

This application is a continuation application, claiming priority under § 365(c), of an International application No. PCT/KR2022/014107, filed on Sep. 21, 2022, which is based on and claims the benefit of a Korean patent application number 10-2021-0127508, filed on Sep. 27, 2021, in the Korean Intellectual Property Office, the disclosure of which is incorporated by reference herein in its entirety.

TECHNICAL FIELD

The disclosure relates to an electronic device for adjusting the light transmittance of a tintable lens and a method for controlling the same.

BACKGROUND ART

Gradually increasing are various services and additional functions provided through devices wearable on a user's body, such as glass-type wearable devices (or smart glasses). To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

The above information is presented as background information only to assist with an understanding of the disclosure. No determination has been made, and no assertion is made, as to whether any of the above might be applicable as prior art with regard to the disclosure.

DISCLOSURE

Technical Problem

The glasses-type wearable device may provide augmented reality to the user. For example, the user may look at the real world (or the external world) while wearing the glasses-type wearable device, and the glass-type wearable device may display virtual images (or visual objects). Thus, the user may be provided with a virtual image-overlaid real world. The glass-type wearable device may include a at least partially transparent (or translucent) member. The glass-type wearable device may output the above-described virtual image through the member.

When the glass-type wearable device displays the virtual image, the visibility of the virtual image and recognition degree for the external world (e.g., real world) may be varied depending on the ambient brightness. For example, although the virtual image is output (or displayed) in the same brightness, if the ambient brightness is high, the visibility for the external world is sufficient (e.g., relatively high), but the visibility of the virtual image may be relatively low. For example, if the ambient brightness is low, the visibility of the virtual image is sufficient (e.g., relatively high), but the visibility for the external world may be relatively low. As such, if the visibility of the virtual image and the visibility for the external world are varied depending on the ambient brightness when the glass-type wearable device displays the virtual image, the user may feel uncomfortable upon receiving the real world.

To increase the visibility of the virtual image, the glass-type wearable device may include a color-changeable (or tintable) lens (hereinafter, color-changing lens). The color-changing lens may include a member that may adjust its light transmittance (hereinafter, transmittance) depending on ambient brightness. For example, types of color-changing lenses include a photochromic type that adjusts the transmittance through a chemical action by ultraviolet (UV) without external power, an electrochromic (EC) type that adjusts the transmittance by an electrical signal from an external power source, a liquid crystal (LC) type, and/or a guest-host liquid crystal (GHLC) type. Or, a transmittance-fixed lens (e.g., tinted lens) and/or film (e.g., tinted lens) may be attached to the display member of the glass-type wearable device.

When the color-changing lenses are included, it is possible to increase the visibility of the virtual image by adjusting transmittance. However, since the manufactured material has basically a light blocking characteristic (e.g., a light blocking characteristic of a predetermined level or more exists), the visibility for the external world in a dark ambient environment may be lower than when the above-described color-changing lenses are absent. Even when the above-described color-changing lens or film is included, the visibility for the external world may be lower than when the above-described color-changing lens or film is absent.

Meanwhile, if the transmittance is adjusted to be low even on the area where the virtual image is not displayed in the transparent (or translucent) member where the virtual image is displayed, the overall visibility for the external world may be lowered, and restrictions may be posed on the user's activity.

Aspects of the disclosure are to address at least the above-mentioned problems and/or disadvantages and to provide at least the advantages described below. Accordingly, an aspect of the disclosure is to provide an electronic device to which a color-changing lens may be detachably attached and a method for controlling the same.

Another aspect of the disclosure is to provide an electronic device for wirelessly supplying power to a detachable and/or attachable color-changing lens and a method for controlling the same.

Another aspect of the disclosure is to provide an electronic device that adjusts the transmittance of a partial area of a color-changing lens based on the position where a virtual image (or visual object) is displayed and a method for controlling the same.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first transparent member and a second transparent member where at least one visual object is displayed, a lens frame receiving at least a portion of the first transparent member and at least a portion of the second transparent member, the lens frame configured to: allow an external electronic device including at least one color-changeable lens to be attached thereto, and allow the at least one color-changeable lens to be aligned with at least one of the first transparent member or the second transparent member if the external electronic device is attached to the lens frame, one or more wearing members extending from the lens frame or coupled to the lens frame, at least one camera disposed in the lens frame and at least partially exposed to an outside through at least one hole formed in the lens frame, at least one first transmission coil disposed adjacent to at least a portion of the at least one camera inside the lens frame, and a power transmission circuit configured to transfer a current to the at least one first transmission coil.

Advantageous Effects

According to various embodiments, the user may selectively determine whether to use a color-changing lens depending on the brightness of the ambient environment through a detachable and/or attachable color-changing lens. Thus, it is possible to secure visibility for the external world by avoiding use of the color-changing lens in a dark environment. It is also possible to secure visibility for a virtual image by using the color-changing lens in an environment with sufficient visibility for the external world. It is also possible to increase the visibility for the external world and the visibility of the virtual image by adjusting the transmittance of the color-changing lens depending on the ambient brightness.

According to various embodiments, it is possible to prevent contamination or failure due to a foreign body to the color-changing lens and/or the electronic device by wirelessly supplying power for operating the detachable and/or attachable color-changing lens.

According to various embodiments, it is possible to adjust the transmittance of a partial area corresponding to the position where the virtual image (or visual object) is displayed, thereby securing the visibility for the external world in the remaining area of the color-changing lens while securing the visibility of the virtual image.

Various effects achievable according to the disclosure are not limited by the foregoing effects.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
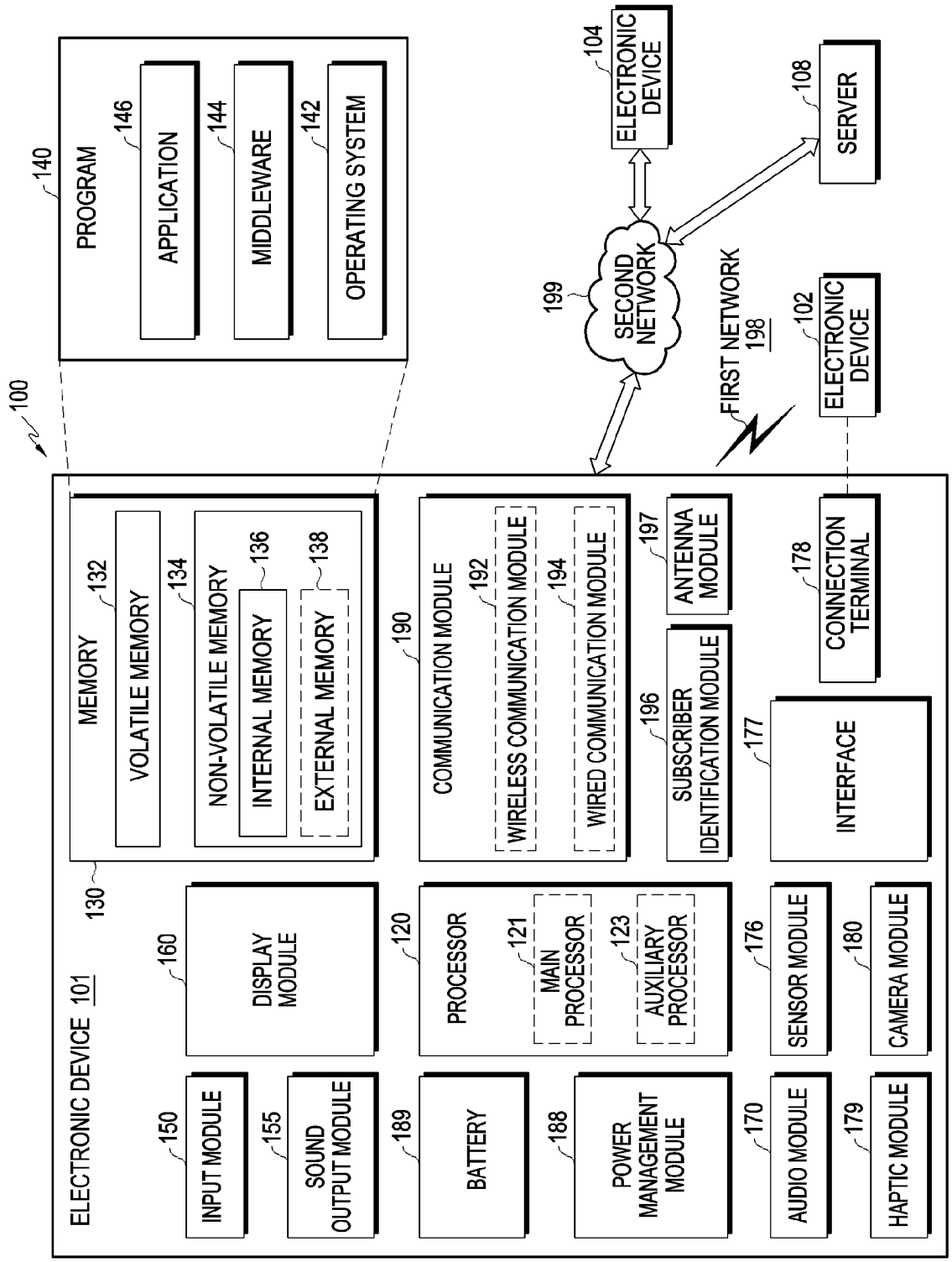
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a $5^{th}$ generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
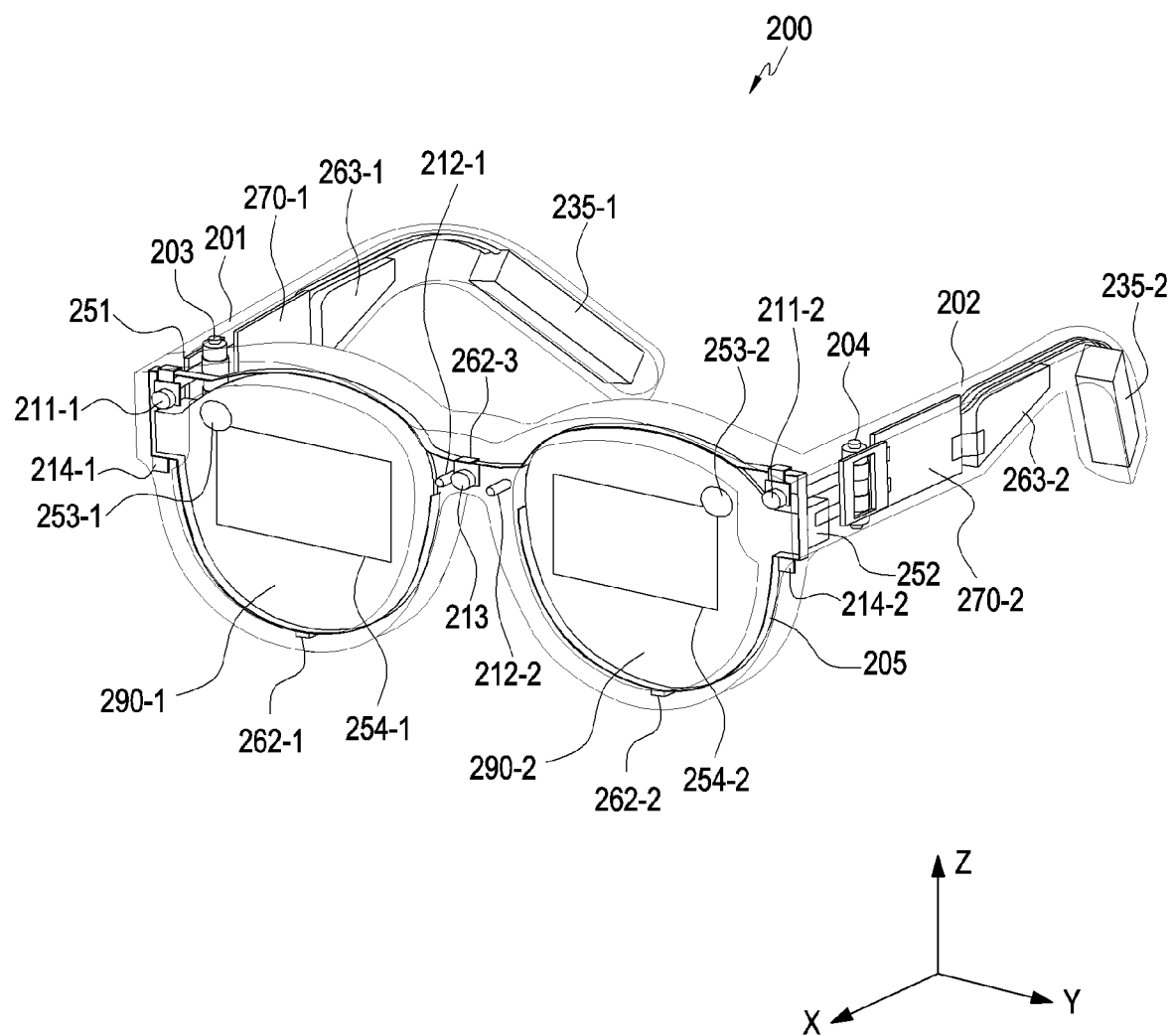
FIG. 2 illustrates a structure of an electronic device according to an embodiment of the disclosure.

FIG. 2 illustrates a structure of an electronic device (e.g., the electronic device 101 of FIG. 1) according to an embodiment of the disclosure.

Referring to FIG. 2, as an example of an electronic device 200, a glass-type wearable device is illustrated.

According to various embodiments, the electronic device 200 may include a lens frame 205, a first wearing member 201, a second wearing member 202, a first hinge structure 203 connecting the lens frame 205 with the first wearing member 201, and/or a second hinge structure 204 connecting the lens frame 205 with the second wearing member 202. According to an embodiment, the lens frame 205, the wearing members 201 and 202, and the hinge structures 203 and 204 may be described as constituting a housing of the electronic device 200.

According to various embodiments, the hinge structures 203 and 204 may connect the lens frame 205 with each of the wearing members 201 and 202. According to various embodiments, each hinge structure 203 or 204 may be pivotable on the lens frame 205 or the wearing member 201 or 202. According to an embodiment, the hinge structures 203 and 204 may be omitted. For example, the lens frame 205 and the wearing members 201 and 202 may be coupled (or directly connected) to each other. In this case, the lens frame 205 and the wearing members 201 and 202 may have a fixed shape.

According to various embodiments, the lens frame 205 may receive at least a portion of transparent members 290-1 and 290-2. For example, the lens frame 205 may be formed to surround at least a portion of an edge of each of the transparent members 290-1 and 290-2. According to another embodiment, the lens frame 205 may have a rim shape of a general eyeglass structure.

According to various embodiments, the lens frame 205 may include at least one camera (e.g., first cameras 211-1 and 211-2, second cameras 212-1 and 212-2, and/or a third cameras 213), at least one light emitting element 214-1 and 214-2, at least one display (e.g., a first display 251 and/or a second display 252), at least one audio input device 262-1, 262-2, and 262-3, and/or at least one transparent member 290-1 and 290-2.

According to various embodiments, the at least one camera may include at least one first camera 211-1 and 211-2, at least one second camera 212-1 and 212-2, and/or at least one third camera 213. According to various embodiments, at least one camera (e.g., the first cameras 211-1 and 211-2, the second cameras 212-1 and 212-2, and/or the third camera 213) may at least partially be exposed to the outside through at least one optical hole (not shown) formed in the housing of the electronic device 200. According to various embodiments, at least one camera (e.g., the first cameras 211-1 and 211-2, the second cameras 212-1 and 212-2, and/or the third camera 213) may capture an image of the outside through at least one optical hole (not shown) formed in the housing of the electronic device 200. For example, the first cameras 211-1 and 211-2 may capture an image of the outside through the optical hole (not shown) formed in the lens frame 205 (or the hinge structures 203 and 204). For example, the second cameras 212-1 and 212-2 may capture an image of the outside through the optical hole (not shown) formed in the lens frame 205 (e.g., formed in an inner portion of the lens frame 205 facing the user's left eye and/or right eye). For example, the third camera 213 may capture an image of the outside through the optical hole (not shown) formed in the lens frame 205. The above-described optical holes are described below in greater detail with reference to the drawings.

According to various embodiments, an image obtained through the first cameras 211-1 and 211-2 may be used for detection of the user's hand gesture, tracking the user's head, and/or spatial recognition. According to various embodiments, the first cameras 211-1 and 211-2 may include a stereo camera. For example, the first cameras 211-1 and 211-2 may include a global shutter (GS) camera. As another example, the first cameras 211-1 and 211-2 may include a rolling shutter (RS) camera. According to various embodiments, the first cameras 211-1 and 211-2 may include two or more cameras having substantially the same specifications and/or the same performance. According to various embodiments, the first cameras 211-1 and 211-2 may perform a simultaneous localization and mapping (SLAM) operation through depth capture. According to various embodiments, the first cameras 211-1 and 211-2 may perform spatial recognition for 6 degrees of freedom (DoF) (or 3DoF). According to various embodiments, the first cameras 211-1 and 211-2 may perform recognition on the user's hand gesture. According to yet another embodiment, the first cameras 211-1 and 211-2 may be referred to as recognition cameras.

According to various embodiments, an image obtained through the second cameras 212-1 and 212-2 may be used for detection and/or tracking of the user's pupil. According to various embodiments, the electronic device 200 may display a virtual image through the transparent members 290-1 and 290-2. The electronic device 200 may display the virtual image so that the center of the virtual image corresponds to the position of the pupil (e.g., the direction in which the user gazes). According to various embodiments, the second cameras 212-1 and 212-2 may include GS cameras. According to various embodiments, the first cameras 212-2 and 212-2 may include two or more cameras having substantially the same specifications and/or the same performance. According to various embodiments, the second camera 212-2 may be disposed to correspond to the left eye (e.g., facing the left eye), and the second camera 212-1 may be disposed to correspond to the right eye (e.g., facing the right eye). According to various embodiments, when detecting the user's pupil and/or tracking the user's pupil through the second cameras 212-1 and 212-2, an optical waveguide (e.g., the eye tracking optical waveguide 315 described below) may be used, which is described in more detail with reference to the drawings. According to yet another embodiment, the second cameras 212-1 and 212-2 may be referred to as eye-tracking (ET) cameras.

According to various embodiments, the image obtained through the third camera 213 may be used for detection of the user's hand gesture. According to various embodiments, the third camera 213 may include a high-resolution (HR) camera and/or a photo video (PV) camera. According to various embodiments, the third camera 213 may include a color camera. For example, the third camera 213 may include a GS camera. As another example, the third camera 213 may include an RS camera. According to various embodiments, the third camera 213 may provide (or perform) an auto-focusing (AF) function and/or an image stabilization function (e.g., optical image stabilizer (OIS)).

According to yet another embodiment, at least one of the first camera 211-1 and 211-2 or the third camera 213 may be replaced with a sensor module (e.g., the sensor module 176 of FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to various embodiments, the electronic device 200 may include at least one light emitting element. According to various embodiments, the at least one light emitting element may be disposed on the wearing members 201 and 202, the lens frame 205 and/or the hinge structures 203 and 204, and the at least one light emitting element may be used for at least one ambient camera (e.g., the first cameras 211-1 and 211-2, the second cameras 212-1 and 212-2, and/or the third camera 213). For example, as shown, the light emitting elements 214-1 and 214-2 disposed on the lens frame 205 (or the hinge structures 203 and 204) may be used as means for supplementing the ambient brightness upon performing detection of the user's hand gesture, user's head tracking, and/or space recognition through the ambient first cameras 211-1 and 211-2. As another example, at least one light emitting element (not shown) may be disposed on the wearing members 201 and 202, respectively. For example, the at least one light emitting element (not shown) disposed on the lens frame 205 (e.g., disposed on the inner portion of the lens frame 205 facing the user's left and/or right eye) may be used as auxiliary means for easier pupil detection when detecting and/or tracking the user's pupil through the ambient second cameras 212-1 and 212-2. For example, the at least one light emitting element (not shown) may emit light in an infrared (IR) band. For example, at least one light emitting element (not shown) disposed on the lens frame 205 (e.g., the portion connecting the left portion of the lens frame 205 receiving the transparent member 290-2 corresponding to the left eye and the right portion of the lens frame 205 receiving the transparent member 290-1 corresponding to the right eye) may be used as means for supplementing the ambient brightness upon performing detection on the user's hand gesture through the ambient third camera 213. According to yet another embodiment, the at least one light emitting element may be referred to as an illumination unit and may be implemented as a light emitting diode (LED).

According to various embodiments, the electronic device 200 may include a first display 251, a second display 252, input optical members 253-1 and 253-2, transparent members 290-1 and 290-2, and/or screen display portions 254-1 and 254-2. According to various embodiments, the first display 251 and the second display 252 may include, e.g., a liquid crystal display (LCD), a digital mirror device (DMD), a liquid crystal on silicon (LCoS), or an organic light emitting diode (OLED), and/or a micro light emitting diode (micro LED). According to yet another embodiment, when the first display 251 and the second display 252 include any one of a liquid crystal display device, a digital mirror display device, or a silicon liquid crystal display device, the electronic device 200 may include a light source for radiating light to screen output areas (e.g., the screen display portions 254-1 and 254-2) of the displays 251 and 252. According to yet another embodiment, when the first display 251 and the second display 252 may generate light on their own (e.g., when including either organic light emitting diodes or micro LEDs), the electronic device 200 may provide a virtual image of good quality to the user even when a separate light source is not included, and the electronic device 200 may be lightened. According to various embodiments, the transparent members 290-1 and 290-2 may be formed of at least one of a glass plate, a plastic plate, or a polymer, and may be made transparent or translucent. According to various embodiments, the external world may be viewed by the user through the transparent or translucent transparent members 290-1 and 290-2. According to various embodiments, the first transparent member 290-1 may be disposed to face the user's right eye, and the second transparent member 290-2 may be disposed to face the user's left eye. According to various embodiments, at least a portion of the transparent members 290-1 and 290-2 may be received by the lens frame 205. For example, at least a portion of the first transparent member 290-1 may be received by a portion of the lens frame 205 corresponding to the user's right eye. For example, at least a portion of the second transparent member 290-2 may be received by a portion of the lens frame 205 corresponding to the user's left eye.

According to various embodiments, each transparent member 290-1 or 290-2 may be composed of a plurality of layers. For example, each transparent member 290-1 or 290-2 may include a convex lens, an optical waveguide (e.g., the display optical waveguide 307 to be described below), a concave lens, and/or a prescription (or corrective lens). According to yet another embodiment, the prescription lens may be omitted. According to yet another embodiment, each transparent members 290-1 or 290-2 may further include a protective member (protective glass) that reduces external impact. According to yet another embodiment, each transparent member 290-1 and 290-2 may include an electrochromic lens (hereinafter, a color-changing lens) to be described below. For example, the color-changing lens may be disposed between the convex lens and the optical waveguide. According to yet another embodiment, the color-changing lens may be included in an external electronic device attachable to a housing (e.g., the lens frame 205) of the electronic device 200. According to various embodiments, the light (e.g., image) output from the display 251 or 252 is incident, through the input optical member 253-1 or 253-2, on the transparent member 290-1 or 290-2 (e.g., the screen display portion 254-1 or 254-2) and may be guided through the optical waveguide (not shown) and output optical member (not shown) to the user's eyes (e.g., radiated toward the user's eyes), which is described in more detail with reference to the drawings.

According to various embodiments, the audio input devices 262-1, 262-2, and 262-3 may sense the user's voice or a sound generated around the electronic device 200. For example, the audio input devices 262-1, 262-2, and 262-3 may detect ambient sounds so that the electronic device 200 may provide a speech-to-text (STT) function and may transfer the detected sounds to a processor (e.g., the processor 120 of FIG. 1).

According to various embodiments, the wearing members 201 and 202 may extend from ends of the lens frame 205 and may be supported (or positioned) on the user's body (e.g., ears).

According to various embodiments, each of the wearing members 201 and 202 may include a printed circuit board (PCB) 270-1 or 270-2, an audio output device 263-1 or 263-2, and/or a battery 235-1 or 235-2 (e.g., the battery 189 of FIG. 1).

According to various embodiments, the PCBs 270-1 and 270-2 may transfer the electric signal to at least one component (e.g., a camera, a display, a light emitting element, a processor, an audio input device, a sensor, or a power transmission circuit) of the electronic device 200. According to various embodiments, the PCBs 270-1 and 270-2 may include flexible PCBs (FPCBs). According to various embodiments, each PCB 270-1 or 270-2 may include a first substrate, a second substrate, and an interposer disposed between the first substrate and the second substrate.

According to various embodiments, the batteries 235-1 and 235-2 may store power for operating at least one component of the electronic device 200.

According to various embodiments, the audio output devices 263-1 and 263-2 may output audio data to the outside. For example, the audio output devices 263-1 and 263-2 provide feedback on the user's command (or input) and/or output information about the virtual image (or a visual object) to the outside through audio data.

According to various embodiments, the electronic device 200 may further include at least one sensor module (e.g., the sensor module 176 of FIG. 1).

For example, the electronic device 200 may include at least one proximity sensor (not shown). For example, the proximity sensor may include a hall sensor that detects a change in voltage according to the strength of a magnetic field. The electronic device 200 may detect whether an external magnetic substance (e.g., a magnet) is proximate using the hall sensor. The electronic device 200 may detect attachment of an external electronic device including a magnetic substance (e.g., an external electronic device including a color-changing lens to be described below) by detecting the proximity of the magnetic substance, which is described below in greater detail with reference to the drawings.

For example, the electronic device 200 may include at least one illuminance sensor for detecting ambient brightness. The electronic device 200 may identify external illuminance using the illuminance sensor. Alternatively, the electronic device 200 may identify external illuminance using at least one camera (e.g., the first cameras 211-1 and 211-2 or the third camera 213). The electronic device 200 may perform at least one operation for adjusting the transmittance of the color-changing lens included in the electronic device 200 or the external electronic device 510 based on the identified external illuminance.

According to various embodiments, the electronic device 200 may further include a power transmission circuit (not shown) for supplying power to the outside and a transmission coil, which is described below in greater detail with reference to the drawings.

Figure 3:
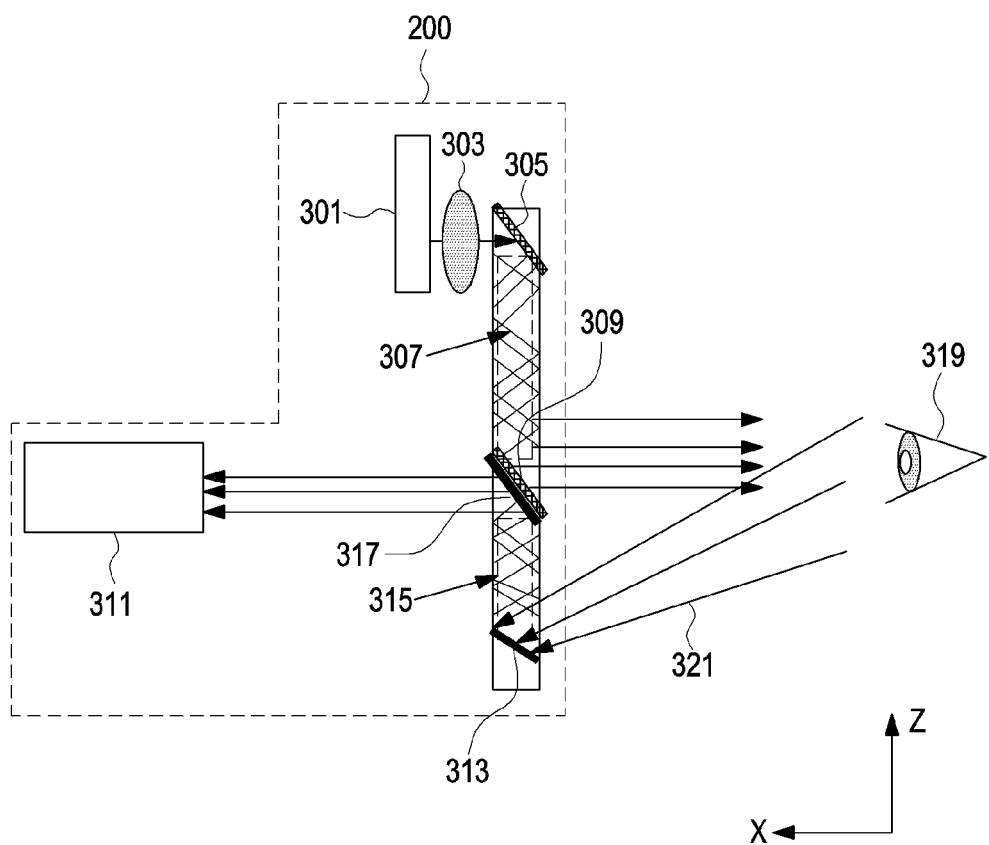
FIG. 3 illustrates a structure of an eye tracking camera and a display of an electronic device according to an embodiment of the disclosure.

FIG. 3 illustrates a display (e.g., the first display 251 or the second display 252 of FIG. 2) of an electronic device and an eye tracking camera (e.g., the second camera 212-1 or 212-2 of FIG. 2) according to an embodiment of the disclosure.

Referring to FIG. 3, according to various embodiments, the electronic device 200 may include a display 301, a projection lens 303, an input optical member 305 (e.g., the input optical member 253-1 or 253-2 of FIG. 2), a display optical waveguide 307, an output optical member 309, an eye tracking camera 311, a first splitter 313, an eye tracking optical waveguide 315, and/or a second splitter 317.

According to various embodiments, the display optical waveguide 307 and/or the eye tracking optical waveguide 315 may be formed of at least one of glass, plastic, or polymer. According to various embodiments, the display optical waveguide 307 and/or the eye tracking optical waveguide 315 may include a nano pattern (e.g., a polygonal or curved grating structure) formed on an inner or outer surface. According to an embodiment, the light incident on one end of the display optical waveguide 307 and/or the eye tracking optical waveguide 315 may be propagated inside the display optical waveguide 307 and/or eye tracking optical waveguide 315 by the nano pattern and be output through the other end of the display optical waveguide 307 and/or eye tracking optical waveguide 315. According to another embodiment, when the display optical waveguide 307 and/or the eye tracking optical waveguide 315 includes a free-form prism, the incident light may be output to the outside through a reflective element (e.g., a reflective mirror). According to various embodiments, at least one diffractive element (e.g., a diffractive optical element (DOE) and/or a holographic optical element (HOE)) for the display optical waveguide 307 and/or the eye tracking optical waveguide 315 and/or at least one reflective element (e.g., a reflective mirror) may be included. According to various embodiments, the at least one diffractive element for the display optical waveguide 307 may include an input optical member 305 and an output optical member 309 to be described below. According to various embodiments, the input optical member 305 may be referred to as an input grating area. According to various embodiments, the output optical member 309 may be referred to as an output grating area. According to various embodiments, the at least one diffractive element for the eye tracking optical waveguide 315 may include the first splitter 313 and the second splitter 317. According to various embodiments, the at least one reflective element may include a total internal reflection optical element and/or a total internal reflection waveguide for total internal reflection (TIR). For example, if the angle of incidence is set so that the light (e.g., virtual image, or light 321) input from the input optical member 305 (or the first splitter 313) is reflected by substantially 100% on the display optical waveguide 307 (or the eye tracking optical waveguide 315), the light (e.g., virtual image or light 321) may be transferred by substantially 100% to the output optical member 309 (or the second splitter 317).

According to various embodiments, the light output from the display 301 may be refracted by the projection lens 303 and converge into a smaller aperture area. According to various embodiments, the light refracted by the projection lens 303 may pass through the input optical member 305 (e.g., at least part of the light is diffracted and/or reflected by the input optical member 305) and be incident on the display optical waveguide 307. According to various embodiments, the light incident on the display optical waveguide 307 may pass through the display optical waveguide 307 (e.g., propagates in the display optical waveguide 307) and be output through the output optical member 309 (e.g., at least part of the light is diffracted and/or reflected by the output optical member 309). According to various embodiments, the light output through the output optical member 309 may be radiated toward the user's eye 319 and be seen by the user. In describing various embodiments of the disclosure, that "the electronic device displays a virtual image (or a visual object)" may mean that the light output from the display 301 is output through the output optical member 309, and the shape of the virtual image (or visual object) is seen by the user's eye 319 by the light output through the output optical member 309. According to various embodiments, as described above, an image may be formed on the screen display portion (e.g., the screen display portion 254-1 or 254-2 of FIG. 2) of the transparent member (e.g., the transparent member 290-1 or 290-2 of FIG. 2) by the light radiated to the user's eye 319, and the user may view the image formed on the screen display portion 254-1 or 254-2.

According to various embodiments, the light 321 reflected from the user's eye 319 may pass through the first splitter 313 (e.g., at least part of the light is diffracted and/or reflected by the first splitter 313) and be incident on the eye tracking optical waveguide 315. For example, as described in connection with FIG. 2, a light emitting element (not shown) for outputting light (e.g., infrared (IR) band light) may be disposed around each second camera 212-1 or 212-2, and the output light (e.g., infrared (IR) band light) may be reflected by the user's eye 319 and be incident on the first splitter 313 and the eye tracking optical waveguide 315. According to various embodiments, the light incident on the eye tracking optical waveguide 315 may pass through the eye tracking optical waveguide 315 (e.g., propagated in the eye tracking optical waveguide 315) and be radiated (e.g., output) to the eye tracking camera 311 through the second splitter 317 (e.g., at least part of the light is diffracted and/or reflected by the second splitter 317). According to various embodiments, the light radiated to the eye tracking camera 311 may be detected by the eye tracking camera 311, and detection and/or tracking on the user's pupil may be performed.

Figure 4A:
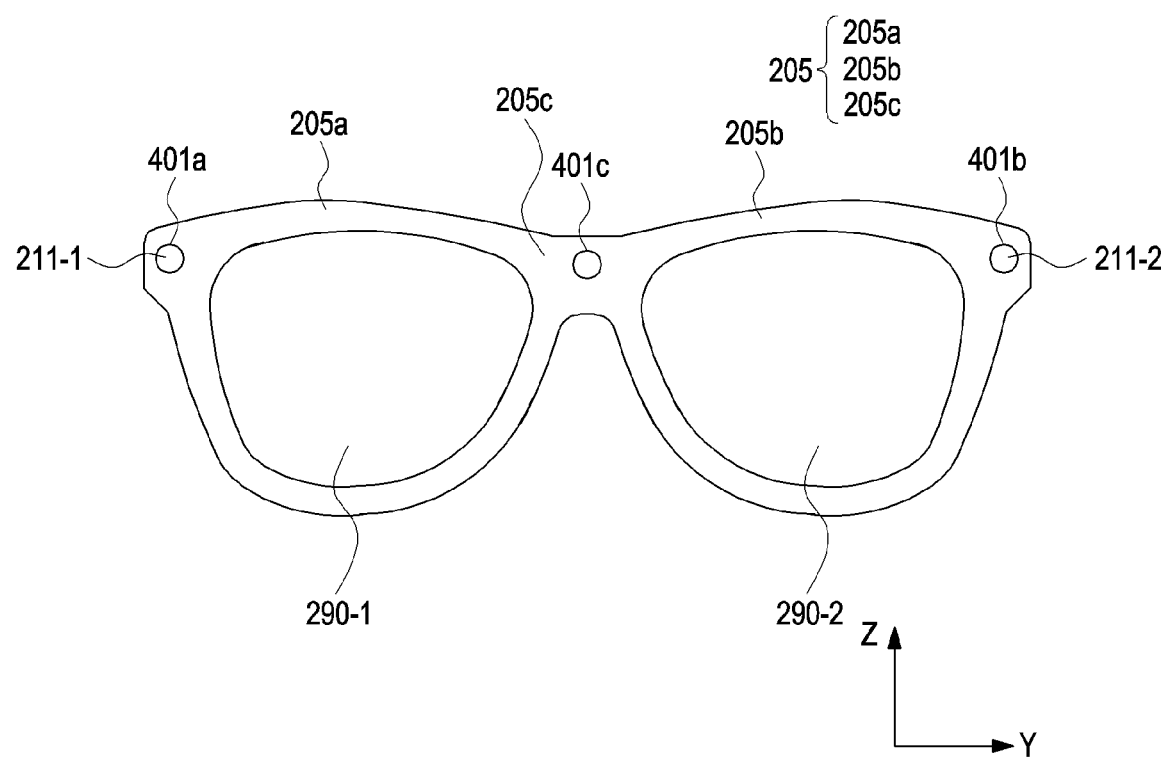
FIG. 4A is a view illustrating an outer appearance of an electronic device in a direction according to an embodiment of the disclosure.

FIG. 4A is a view illustrating an outer appearance of an electronic device 200 in a direction according to an embodiment of the disclosure.

Figure 4B:
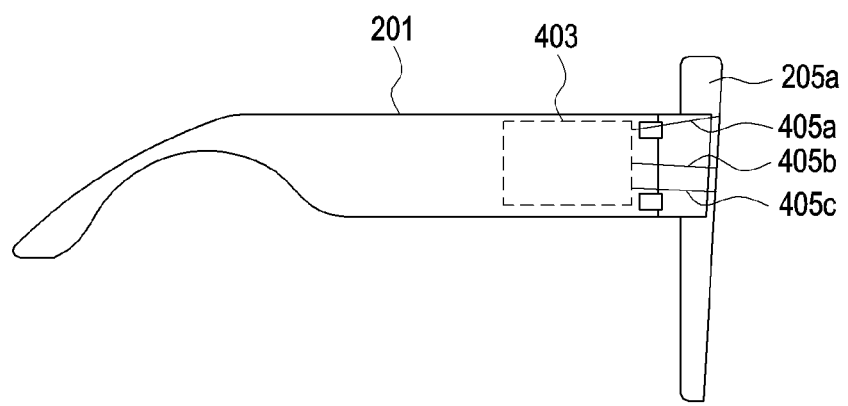
FIG. 4B is a view illustrating an outer appearance of an electronic device in another direction according to an embodiment of the disclosure.

FIG. 4B is a view illustrating an outer appearance of an electronic device 200 in another direction according to an embodiment of the disclosure.

Referring to FIG. 4A, an outer appearance of the electronic device 200 as viewed in the front direction (e.g., the −X direction of FIG. 2).

According to various embodiments, the lens frame 205 may receive at least part of the first transparent member 290-1 and at least part of the second transparent member 290-2. Reference number 205a denotes a part (hereinafter, a first part) surrounding at least a portion of the edge of the first transparent member 290-1 of the lens frame 205. Reference number 205b denotes a part (hereinafter, a second part) surrounding at least a portion of the edge of the second transparent member 290-2 of the lens frame 205. Reference number 205c denotes a part (hereinafter, a third part) connecting the first part 205a and the second part 205b, of the lens frame 205. In the disclosure, for convenience of description, the lens frame 205 is described as divided into the first part 205a, the second part 205b, and the third part 205c, but the above-described parts 205a, 205b, and 205c are not separated elements, but the above-described parts 205a, 205b, and 205c may be described as constituting a single lens frame 205.

Although not shown, the other end (e.g., side surface) of the first part 205a may be connected with the first wearing member (e.g., the first wearing member 201 of FIG. 2), and the other end (e.g., side surface) of the second part 205b may be connected with the second wearing member (e.g., the second wearing member 202 of FIG. 2). For example, the other end of the first part 205a and the other end of the second part 205b may be connected with the first wearing member 201 and the second wearing member 202, respectively, through hinge structures (e.g., the hinge structures 203 and 204 of FIG. 2). As another example, the other end of the first part 205a and the other end of the second part 205b may be coupled (or directly connected) with the first wearing member 201 and the second wearing member 202, respectively.

According to various embodiments, at least one hole (e.g., an optical hole) may be formed in the lens frame 205. According to various embodiments, at least one camera may be disposed to correspond to at least one hole. For example, the first cameras 211-1 and 211-2 may be disposed in the first part 205a and the second part 205b to correspond to the first optical hole 401a and the second optical hole 401b, respectively. At least part (e.g., the lens of each first camera) of the first cameras 211-1 and 211-2 may be exposed to the outside through the first optical hole 401a and the second optical hole 401b. For example, the third camera 213 may be disposed in the third part 205c to correspond to the third optical hole 401c. At least part of the third camera 213 (e.g., the lens of the third camera) may be exposed to the outside through the third optical hole 401c.

According to various embodiments, at least one external electronic device may be attached to the lens frame 205. For example, an external electronic device including at least one color-changeable lens may be attached to the lens frame 205, which is described below in greater detail with reference to the drawings.

Referring to FIG. 4B, an outer appearance of the electronic device 200 as viewed from outside to a side (e.g., the +Y direction of FIG. 2). Although FIG. 4B illustrates the first part 205a of the lens frame 205 and the first wearing member 201, the second part 205b of the lens frame 205 and the second wearing member 202 may also have all or some and/or structures of the components described below.

According to various embodiments, components 403 of the electronic device 200 may be disposed in the first wearing member 201. For example, the components 403 may include a processor (e.g., the processor 120 of FIG. 1), a communication circuit (e.g., the communication module 190 of FIG. 1), and/or a power transmission circuit (not shown). According to an embodiment, the components 403 may further include at least one driving circuit. According to various embodiments, the components 403 may be disposed on a PCB (e.g., the first PCB 270-1 of FIG. 2).

According to various embodiments, the processor 120 may control the components included in the electronic device 200 and perform various data processing or computations. For example, the processor 120 may execute software (e.g., a program) to control other components (e.g., hardware or software components) connected with the processor 120 and may perform various data processing and computations. For example, as at least part of the data processing or computation, the processor 120 may store a command or data received from another component (e.g., the sensor module 176 or communication module 190 of FIG. 1) in a volatile memory, process the command or the data stored in the volatile memory, and store resulting data in a non-volatile memory. For example, the processor 120 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor. For example, when the electronic device 200 includes the main processor and the auxiliary processor, the auxiliary processor may be configured to use lower power than the main processor or to be specified for a designated function. The auxiliary processor may be implemented as separate from, or as part of the main processor.

According to various embodiments, the communication circuit (e.g., the communication module 190) may transmit and/or receive data with at least one external electronic device (e.g., the electronic devices 102 and 104 of FIG. 1). For example, the at least one external electronic device (e.g., the electronic device 102 or 104) may include a portable terminal (e.g., a smart phone) and/or a device including at least one lens (e.g., a color-changing lens). According to various embodiments, the communication circuit (e.g., the communication module 190) may transmit control information to an external electronic device 510 which is described below. For example, the control information may include information (e.g., forward voltage or reverse voltage) related to the direction of the voltage to be applied to the color-changing lens and/or information about the area of the color-changing lens to be adjusted for transmittance. According to various embodiments, the communication circuit (e.g., the communication module 190) may receive, from a portable terminal (e.g., a smartphone), data for the virtual image to be displayed through the display (e.g., to be displayed on the transparent members).

According to various embodiments, the power transmission circuit (not shown) may include a power adapter, a power generation circuit, and/or a matching circuit. According to various embodiments, the power transmission circuit may wirelessly transmit power to an external electronic device through a transmission coil. Operations of the power transmission circuit to be described below may be controlled by, e.g., the processor 120. According to various embodiments, the power transmission circuit may receive power in the form of a DC or AC waveform from the outside and may supply the received power, in the form of an AC waveform, to the external electronic device. According to various embodiments, the power adapter may receive AC or DC power from the outside or receive a power signal of a battery (e.g., the battery 189 of FIG. 1) to output DC power having a set voltage value. According to various embodiments, the power generation circuit may convert a DC current output from the power adapter into an AC current and output the converted current. For example, the power generation circuit may include a predetermined amplifier (e.g., a power amplifier (PA)) and/or an inverter. The power generation circuit may amplify the DC current to have a set gain, using the amplifier. The power generation circuit may convert a DC current into an AC current using an inverter. According to various embodiments, the matching circuit may provide impedance matching. For example, the matching circuit may include at least one inductor and/or at least one capacitor. According to various embodiments, the AC current output from the power generation circuit may be transferred to the transmission coil, and an induced magnetic field may be generated from the transmission coil by the transferred AC current.

According to another embodiment, the electronic device 200 may include a plurality of transmission coils for wirelessly transmitting power to the external electronic device (e.g., a device including a color-changing lens). The electronic device may transfer, to the external electronic device, information related to the direction (e.g., forward voltage or reverse voltage) of the voltage to be applied to the color-changing lens by determining the transmission coil for wirelessly transmitting power to the external electronic device, among the plurality of transmission coils. For example, the electronic device 200 may include a first transmission coil disposed in the first part 205a of the lens frame 205, a second transmission coil disposed in the second part 205b of the lens frame 205, and a third transmission coil disposed in the third part of the frame 205. The electronic device 200 may apply a current to the first transmission coil and/or the second transmission coil so that the external electronic device applies a forward voltage to the color-changing lens. The external electronic device may include reception coils corresponding to (e.g., disposed in positions corresponding to) the first transmission coil and/or the second transmission coil and, if wireless power is received through the reception coils corresponding to the first transmission coil and/or the second transmission coil, a forward voltage may be applied to the color-changing lens included in the external electronic device. The electronic device 200 may apply a current to the third coil so that the external electronic device applies a reverse voltage to the color-changing lens. The external electronic device may include a reception coil corresponding to (e.g., disposed in a position corresponding to) the third transmission coil and, if wireless power is received through the reception coil corresponding to the third transmission coil, a reverse voltage may be applied to the color-changing lens included in the external electronic device. The above-described combination of transmission coils for wirelessly transmitting power to the external electronic device is exemplary, and information to allow the external electronic device to apply a forward voltage or reverse voltage may be transferred to the external electronic device through various combinations.

According to yet another embodiment, the electronic device 200 may include a pogo pin (or a power transmission configuration having a C-clip structure) for transferring power to the external electronic device (e.g., a device having a color-changing lens).

According to yet another embodiment, if the electronic device 200 includes a color-changing lens in the transparent members 290-1 and 290-2, the components 403 may further include at least one driving circuit. According to yet another embodiment, the DC current or DC power received from the outside or the power signal from the battery 189 may be transferred to at least one driving circuit. According to yet another embodiment, the electronic device 200 (e.g., the processor 120) may control at least one driving circuit to apply a forward voltage or reverse voltage to at least part of the color-changing lens included in the transparent members 290-1 and 290-2.

According to various embodiments, at least one sensor (e.g., a hall sensor or an illuminance sensor) may be disposed in the lens frame 205, and an electrical line 405*a* may be included to connect the at least one sensor with the components 403 (e.g., the processor 120 or the first PCB 270-1). According to various embodiments, an electrical signal may be output from the at least one sensor, and the output electrical signal may be transferred through the electrical line 405*a* to the processor 120. According to yet another embodiment, at least one sensor (e.g., an illuminance sensor) may be disposed in the first wearing member 201 and/or the second wearing member 202.

According to various embodiments, at least one transmission coil may be disposed in the lens frame 205 and electrical lines 405*b* and 405*c* for connecting the at least one transmission coil with the components 403 (e.g., the power transmission circuit) may be included. According to various embodiments, the AC current output from the power transmission circuit (e.g., the power generation circuit) may be transferred to the transmission coil through the electrical line 405*b*.

According to various embodiments, the electrical lines 405*a*, 405*b*, and 405*c* may connect the above-described components of the electronic device 200, inside the first wearing member 201, the lens frame 205, and/or the first hinge structure 203.

Figure 5A:
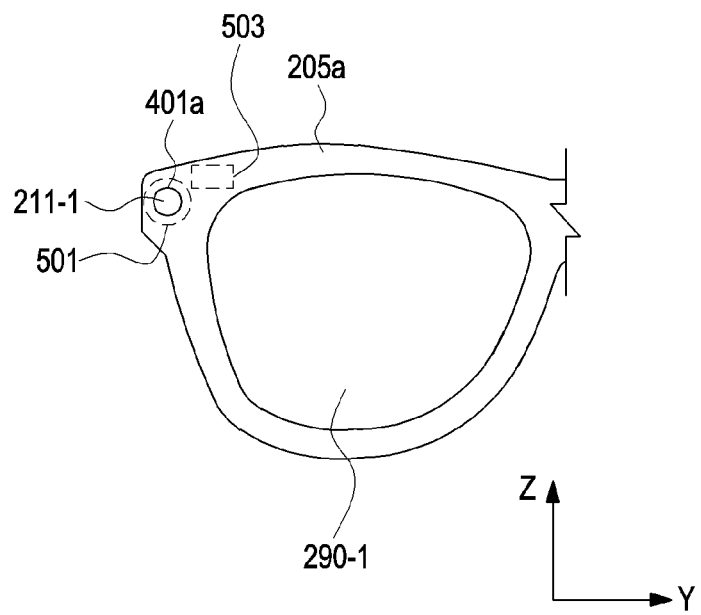
FIG. 5A is a view illustrating an example of placement of a transmission coil and a sensor of an electronic device according to an embodiment of the disclosure.

FIG. 5A is a view illustrating an example of placement of a transmission coil and/or a sensor (e.g., the sensor module 176 of FIG. 1) of an electronic device 200 according to an embodiment of the disclosure.

Figure 5B:
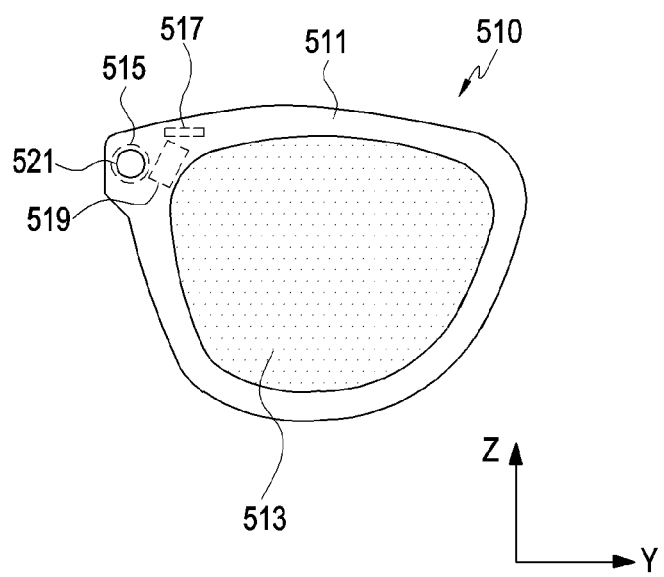
FIG. 5B is a view illustrating an external electronic device including at least one lens and an example of placement of a reception coil and/or a magnetic substance of the external electronic device according to an embodiment of the disclosure.

FIG. 5B is a view illustrating an external electronic device including at least one lens and an example of placement of a reception coil and/or a magnetic substance of the external electronic device according to an embodiment of the disclosure.

Figure 5C:
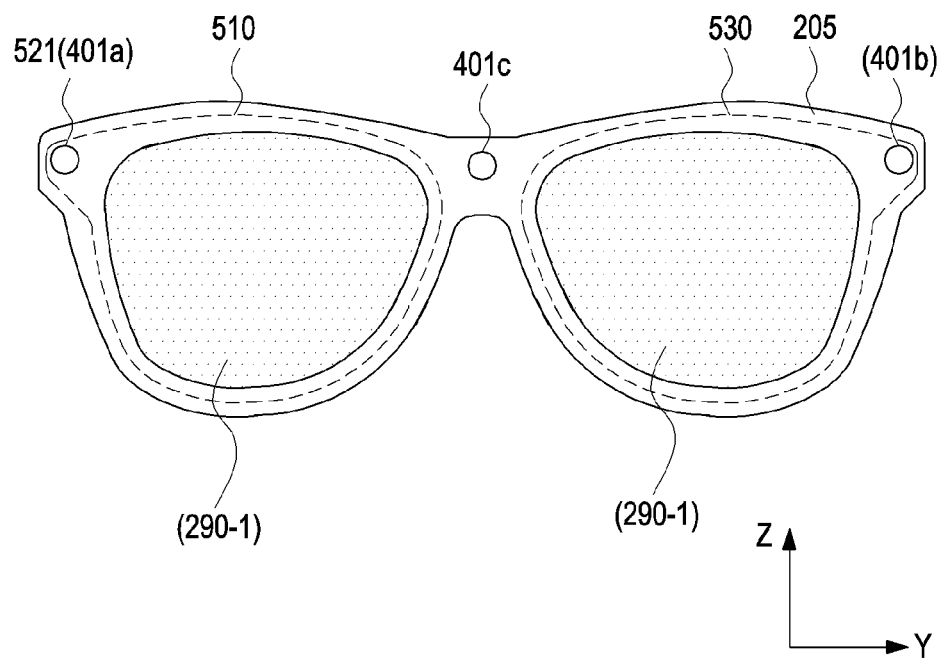
FIG. 5C is a view illustrating an example in which an electronic device and an external electronic device are coupled to each other according to an embodiment of the disclosure.

FIG. 5C is a view illustrating an example in which an electronic device and an external electronic device are coupled to each other according to an embodiment of the disclosure.

Referring to FIG. 5A, an electronic device 200 may include a lens frame (e.g., the lens frame 205 of FIG. 2), a first transparent member 290-1, a transmission coil 501, and a sensor 503. As shown, the transmission coil 501 and the sensor 503 may be disposed in the first part 205*a* of the lens frame (e.g., the lens frame 205 of FIG. 2). According to an embodiment, the transmission coil 501 and the sensor 503 may be disposed in the second part 205*b* of the lens frame 205, or the transmission coil 501 and the sensor 503 may be disposed in the first part 205*a*, and an additional transmission coil (not shown) and an additional sensor (not shown) (e.g., a hall sensor) may be disposed in the second part 205*b*.

According to various embodiments, the lens frame 205 may include a metal material. According to various embodiments, the external electronic device 510 described below may include one or more magnetic substances (e.g., magnets), and the external electronic device 510 including one or more magnetic substances may be attached to the lens frame 205 including the metal material. According to another embodiment, at least one fastening means may be included in the lens frame 205 and/or the wearing members 201 and 202, and the external electronic device 510 may be fastened (or coupled) to the lens frame 205 and/or the wearing members 201 and 202 by the at least one fastening means.

According to various embodiments, the transmission coil 501 may be disposed adjacent to the first camera 211-1. For example, at least a portion of the first camera 211-1 may be exposed to the outside through the first optical hole 401*a*, and the transmission coil 501 may be disposed adjacent to (e.g., within a designated distance from) at least the portion exposed to the outside of the first camera 211-1. For example, the transmission coil 501 may be disposed in the first part 205*a* to surround the first optical hole 401*a* when viewed from one direction (e.g., the front direction).

According to various embodiments, the electronic device 200 may wirelessly supply power to the external electronic device 510 using the transmission coil 501. For example, the electronic device 200 may control the power transmission circuit to transfer current to the transmission coil 501. According to various embodiments, when the attachment (or fastening) of the external electronic device 510 to the lens frame 205 is identified, the electronic device 200 may wirelessly supply power to the external electronic device 510. According to various embodiments, when the detachment (or separation) of the external electronic device 510 from the lens frame 205 is identified, the electronic device 200 may stop the wireless power supply to the external electronic device 510.

According to various embodiments, the sensor 503 may be disposed adjacent to the first camera 211-1. For example, the sensor 503 may be disposed adjacent to (e.g., within a designated distance from) at least a portion (e.g., the lens of the first camera) exposed to the outside of the first camera 211-1. For example, the sensor 503 may be disposed adjacent to the first optical hole 401*a* (e.g., within a designated distance).

According to various embodiments, the sensor 503 may include a hall sensor that detects proximity of an ambient magnetic substance. According to various embodiments, the electronic device 200 may detect the proximity of the ambient magnetic substance using the sensor 503. For example, the external electronic device 510 to be described below may include one or more magnetic substances. The electronic device 200 may detect whether at least one of the one or more magnetic substances is proximate using the sensor 503 to identify whether the external electronic device 510 is attached to the lens frame 205, Although not shown, the electronic device 200 may further include an electromagnet disposed in the lens frame 205. According to various embodiments, the electronic device 200 may control the external electronic device 510 to adjust the transmittance of the color-changing lens 513 by transmitting a first control signal to the external electronic device 510 through the electromagnet (e.g., transfer current to the electromagnet) or by not transmitting the first control signal (e.g., by not transferring current to the electromagnet). For example, the electronic device 200 may transfer current to the electromagnet to control the external electronic device 510 to reduce the transmittance of the color-changing lens 513 of the external electronic device 510 and may not transfer current to the electromagnet to control the external electronic device 510 to increase the transmittance of the color-changing lens 513. As another example, the electronic device 200 may transfer current to the electromagnet, n times (e.g., once), within a designated time period to control the external electronic device 510 to decrease the transmittance of the color-changing lens 513 of the external electronic device 510 and may transfer current to the electromagnet, m times (e.g., twice) (m differs from n), within a designated time period to control the external electronic device 510 to increase the transmittance of the color-changing lens 513. As another example, the electronic device 200 may transfer current to the electromagnet during first duration to control the external electronic device 510 to decrease the transmittance of the color-changing lens 513 and may transfer current to the electromagnet during second duration different from the first duration to control the external electronic device 510 to increase the transmittance of the color-changing lens 513.

Referring to FIG. 5B, the external electronic device 510 may include a lens frame 511, a color-changing lens 513, a reception coil 515, a magnetic substance 517, and/or components 519. According to an embodiment, the external electronic device 510 may be manufactured as a pair of external electronic devices including components equal or similar to the above-described components. For example, the pair of external electronic devices may be manufactured to be separated from each other, and the pair of external electronic devices each may include the above-described components. As another example, the pair of external electronic devices may be manufactured to be connected to each other (e.g., constituting a single external electronic device), and the plurality of external electronic devices each may include the above-described components or either external electronic device may omit at least some of the reception coil 515, the magnetic substance 517, and/or the components 519.

According to various embodiments, the lens frame 511 may receive at least part of the color-changing lens 513. For example, the lens frame 511 may be formed to surround at least part of the edge of the color-changing lens 513. According to various embodiments, the lens frame 511 may be formed so that the color-changing lens 513 and the first transparent member 290-1 are aligned with each other, if attached to the electronic device 200.

According to various embodiments, the color-changing lens 513 may include a plurality of layers. For example, the color-changing lens 513 may include a convex lens, an electrochromic lens (EC) (or liquid crystal (LC) lens), a concave lens, and/or a prescription lens (or corrective lens). According to various embodiments, at least a partial area of the color-changing lens 513 (e.g., an electrochromic (EC) lens, or a liquid crystal (LC) lens) may be adjusted for transmittance based on a voltage applied from at least one driving circuit.

According to various embodiments, the reception coil 515, the magnetic substance 517, and the components 519 may be disposed in the lens frame 511. According to an embodiment, the magnetic substance 517 may be disposed on the outer surface of the lens frame 511.

According to various embodiments, the reception coil 515 may be disposed to be aligned with the transmission coil 501. For example, in the lens frame 511, an optical hole 521 may be formed in a position corresponding to the first optical hole 401a of the electronic device 200, and the reception coil 515 may be disposed adjacent to the optical hole 521 (e.g., within a designated distance). As an example, the reception coil 515 may be disposed in the lens frame 511 to surround the optical hole 521 when viewed from one direction (e.g., the front direction).

According to various embodiments, the magnetic substance 517 may include, e.g., a magnet. According to various embodiments, the lens frame 511 may include one or more magnetic substances. According to various embodiments, the lens frame 511 may be attached to the lens frame 205 of the electronic device 200 by one or more magnetic substances. According to various embodiments, at least one (e.g., the magnetic substance 517) of the one or more magnetic substances may be detected by the sensor 503 (e.g., a hall sensor) of the electronic device 200.

According to various embodiments, the components 519 may include a power reception circuit (not shown) and at least one driving circuit. According to various embodiments, the power reception circuit (not shown) may include a matching circuit, a rectification circuit, and/or a regulation circuit. According to various embodiments, the power reception circuit may receive power from the outside (e.g., the electronic device 200) through a reception coil. According to various embodiments, the power reception circuit may receive, through the reception coil 515, wireless power in the form of an electromagnetic wave, generated in response to the current/voltage applied to the transmission coil 501. According to various embodiments, based on the induced magnetic field generated from the transmission coil 501, an induced electromotive force may be generated in the reception coil 515 and an AC current may be output from the reception coil 515. According to various embodiments, the matching circuit may provide impedance matching. For example, the matching circuit may include at least one inductor and/or at least one capacitor. According to various embodiments, the rectification circuit may rectify the AC current output from the reception coil 515 into a DC current. According to various embodiments, the regulation circuit may convert the rectified power to have a set gain. For example, the regulation circuit may include a DC/DC converter. According to various embodiments, the power output from the regulation circuit may be transmitted to the outside of the power reception circuit. For example, the power output from the power reception circuit may be provided to at least one hardware component (e.g., at least one driving circuit, the color-changing lens 513 and/or a battery) connected to the power reception circuit.

According to various embodiments, the components 519 may further include a communication circuit. For example, the communication circuit may provide functions equal or similar to those of the communication module 190 of FIG. 1 and/or may perform operations equal or similar to those of the communication module 190 of FIG. 1. According to various embodiments, the communication circuit may transmit and/or receive information to/from the electronic device 200. According to various embodiments, the communication circuit may output a second control signal to the at least one driving circuit. For example, upon receiving first control information (e.g., control information to apply a forward voltage) from the electronic device 200, the communication circuit may output a first signal to at least one driving circuit. The at least one driving circuit may apply a forward voltage to at least a portion of the color-changing lens 513 using the power output from the power reception circuit based on the received first signal. Upon receiving second control information (e.g., control information to apply a reverse voltage) from the electronic device 200 or upon failing to receive the first control information, the communication circuit may not output the first signal, or may output a second signal, to the at least one driving circuit. The at least one driving circuit may apply a reverse voltage to at least a portion of the color-changing lens 513 using the power output from the power reception circuit, based on failure to receive the first signal or reception of the second signal.

According to various embodiments, the external electronic device 510 may further include at least one sensor disposed in the lens frame 511. For example, the at least one sensor may provide functions equal or similar to those of the sensor module 176 of FIG. 1 and/or may perform operations equal or similar to those of the sensor module 176 of FIG. 1. For example, the at least one sensor may include a hall sensor. The hall sensor may output a sensing signal upon detecting an external magnetic substance (e.g., the electromagnet of the electronic device 200). The external electronic device 510 may receive the first control signal of the electronic device 200 using the hall sensor (e.g., detect the electromagnet of the electronic device 200) and apply a forward voltage or reverse voltage to the color-changing lens 513 based on the received first control signal. For example, upon receiving the first control signal (e.g., if the electromagnet of the electronic device 200 is detected, and a sensing signal is received from the hall sensor), the at least one driving circuit may apply a forward voltage to at least a portion of the color-changing lens 513 using the power output from the power reception circuit. Upon failing to receive the first control signal (e.g., if the electromagnet of the electronic device 200 is not detected so that no sensing signal is received from the hall sensor), the at least one driving circuit may apply a reverse voltage to at least a portion of the color-changing lens 513 using the power output from the power reception circuit. As another example, the at least one driving circuit may apply a forward voltage to the color-changing lens 513 using the power output from the power reception circuit upon receiving the first control signal, n times (e.g., once), within a designated time period, based on the number of receptions of the first control signal (e.g., the number of receptions of the sensing signal from the hall sensor) and may apply a reverse voltage to the color-changing lens 513 using the power output from the power reception circuit upon receiving the first control signal, m times (e.g., twice) (m differs from n), within a designated time period. As another example, the at least one driving circuit may apply a forward voltage to the color-changing lens 513 using the power output from the power reception circuit upon receiving the first control signal, during first duration, based on the duration of reception of the first control signal (e.g., the duration during which the sensing signal is received from the hall sensor) and may apply a reverse voltage to the color-changing lens 513 using the power output from the power reception circuit upon receiving the first control signal during second duration different from the first duration.

Referring to FIG. 5C, the external electronic device 510 may be attached to the electronic device 200. For example, the external electronic device 510 may include one or more magnetic substances (e.g., the magnetic substance 517) in the lens frame 511 and be attached to the lens frame 205 of the electronic device 200 by the one or more magnetic substances (e.g., the magnetic substance 517). As illustrated, if the external electronic device 510 is attached to the electronic device 200, the first optical hole 401a and the optical hole 521 may be aligned with each other. At least a portion of the first transparent member 290-1 may be covered by (or overlap) at least a portion (e.g., the color-changing lens 513) of the external electronic device 510. The transmission coil 501 and the reception coil 515 may be aligned with each other.

According to various embodiments, the external electronic device may further include another external electronic device 530 that is the same as or similar to, and forms a pair with, the first external electronic device denoted by reference numeral 510. As illustrated, the external electronic device 510 and the external electronic device 530 may be manufactured to be separated from each other. In this case, the external electronic device 510 and the external electronic device 530 may be separate and independent devices. The external electronic device 530 may likewise include an optical hole corresponding to the second optical hole 401b in the lens frame and a reception coil disposed adjacent to the optical hole. Further, the external electronic device 530 may include a color-changing lens corresponding to the second transparent member 290-2.

Figure 6A:
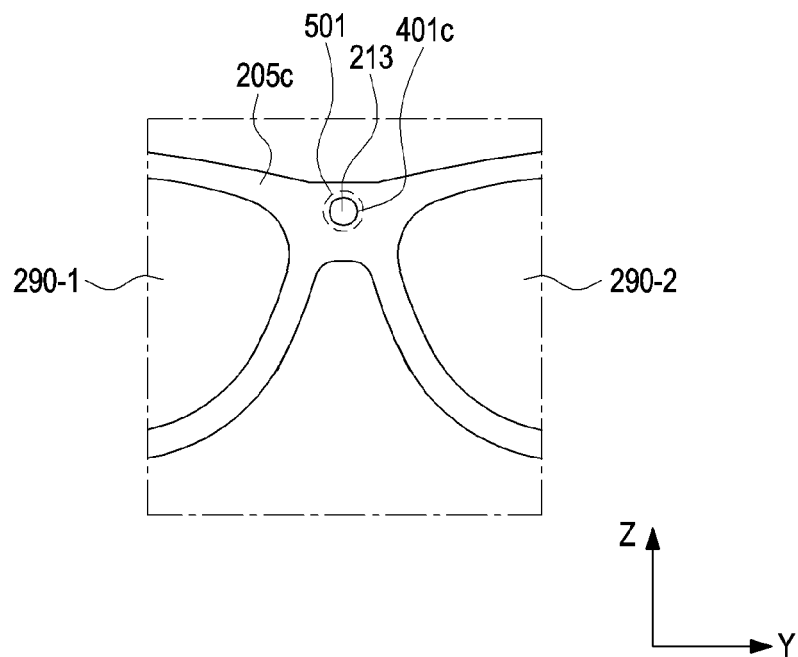
FIG. 6A is a view illustrating another example of placement of a transmission coil of an electronic device according to an embodiment of the disclosure.

FIG. 6A is a view illustrating another example of placement of a transmission coil of an electronic device according to an embodiment of the disclosure.

Figure 6B:
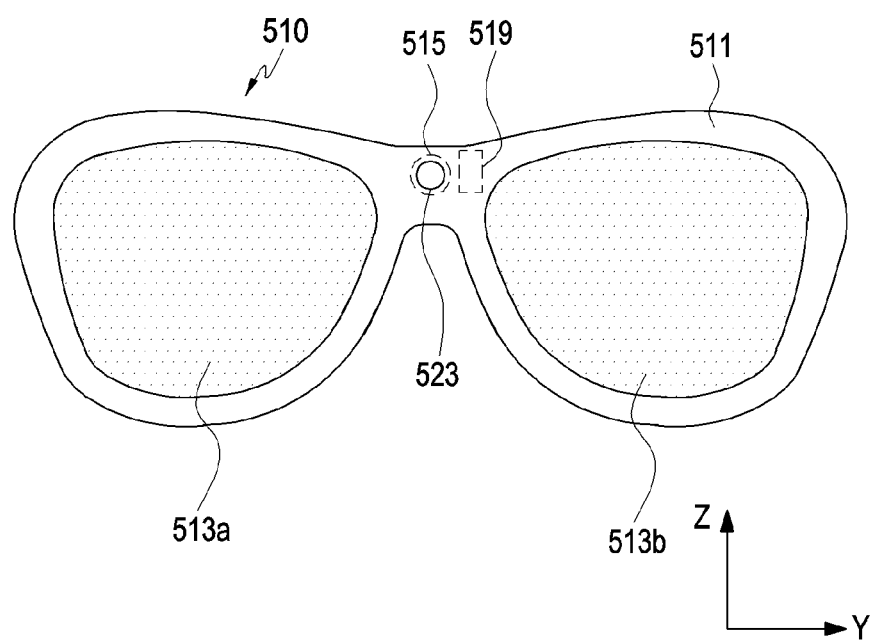
FIG. 6B is a view illustrating an external electronic device including at least one lens and another example of a reception coil of the external electronic device according to an embodiment of the disclosure.

FIG. 6B is a view illustrating an external electronic device including at least one lens and another example of a reception coil of the external electronic device according to an embodiment of the disclosure.

Referring to FIG. 6A, an electronic device 200 may include a lens frame (e.g., the lens frame 205 of FIG. 2), a first transparent member 290-1, a second transparent member 290-2, a third camera 213, and a transmission coil 501.

According to various embodiments, the transmission coil 501 may be disposed in the third part 205c of the lens frame 205. According to various embodiments, the transmission coil 501 may be disposed adjacent to the third camera 213. For example, at least a portion of the third camera 213 may be exposed to the outside through the third optical hole 401c, and the transmission coil 501 may be disposed adjacent to (e.g., within a designated distance from) at least the portion exposed to the outside of the third camera 213. For example, the transmission coil 501 may be disposed in the third part 205c to surround the third optical hole 401c when viewed from one direction (e.g., the front direction (e.g., the −X direction of FIG. 2)). According to an embodiment, the electronic device 200 may further include at least one transmission coil in the third part 205c in addition to the transmission coil 501. For example, the electronic device 200 may further include at least one of a first transmission coil (e.g., the transmission coil 501 of FIG. 5A) disposed in the first part (e.g., the first part 205a of FIG. 2) or a second transmission coil (not shown) disposed in the second part (e.g., the second part 205b of FIG. 2) (e.g., disposed adjacent to the first camera 211-2 or the second optical hole 401b).

Although not shown, the electronic device 200 may include at least one sensor (e.g., the sensor 503 of FIG. 5A) disposed in the lens frame 205. The at least one sensor may be disposed in the third part 205c but may also be disposed in the first part 205a and/or the second part 205b, not the third part 205c, to correspond to the position of at least one magnetic substance of the external electronic device attached to the electronic device 200.

Although not shown, the electronic device 200 may further include an electromagnet disposed in the lens frame 205. The electromagnet may be disposed in the third part 205c but may also be disposed in the first part 205a and/or the second part 205b, not the third part 205c, to correspond to the position of at least one sensor (e.g., a hall sensor) of the external electronic device attached to the electronic device 200.

Referring to FIG. 6B, the external electronic device 510 may include a lens frame 511, a first color-changing lens 513a (e.g., the color-changing lens 513 of FIG. 5B), a second color-changing lens 513b (e.g., the color-changing lens 513), a reception coil 515, and/or components 519.

According to various embodiments, in the lens frame 511, an optical hole 523 may be formed in a position corresponding to the third optical hole 401c of the electronic device 200, and the reception coil 515 may be disposed adjacent to the optical hole 523 (e.g., within a designated distance). As an example, the reception coil 515 may be disposed in the lens frame 511 to surround the optical hole 523 when viewed from one direction (e.g., the front direction). According to an embodiment, unlike shown, the lens frame 511 may cover the portion where the first optical hole 401a and/or the second optical hole 401b of the lens frame 205 of the electronic device 200 is positioned. In this case, in the lens frame 511, at least one optical hole may be formed in the position corresponding to the first optical hole 401a and/or the second optical hole 401b of the electronic device 200, and the external electronic device 510 may further include a reception coil disposed adjacent to the optical hole corresponding to the first optical hole 401a and/or a reception coil disposed adjacent to the optical hole corresponding to the second optical hole 401b.

According to various embodiments, if the external electronic device 510 is attached to the electronic device 200, the third optical hole 401c and the optical hole 523 may be aligned with each other. At least a portion of the first transparent member 290-1 may be covered by the first color-changing lens 513a, and at least a portion of the second transparent member 290-2 may be covered by the second color-changing lens 513b.

According to various embodiments, the components 519 may include a power reception circuit, at least one driving circuit, and/or a communication circuit.

Although not shown, the external electronic device 200 may further include at least one magnetic substance (e.g., a magnet) disposed inside the lens frame 511 or on the outer surface of the lens frame 511. The external electronic device 200 may further include at least one sensor (e.g., a hall sensor) disposed in the lens frame 511.

Figure 7:
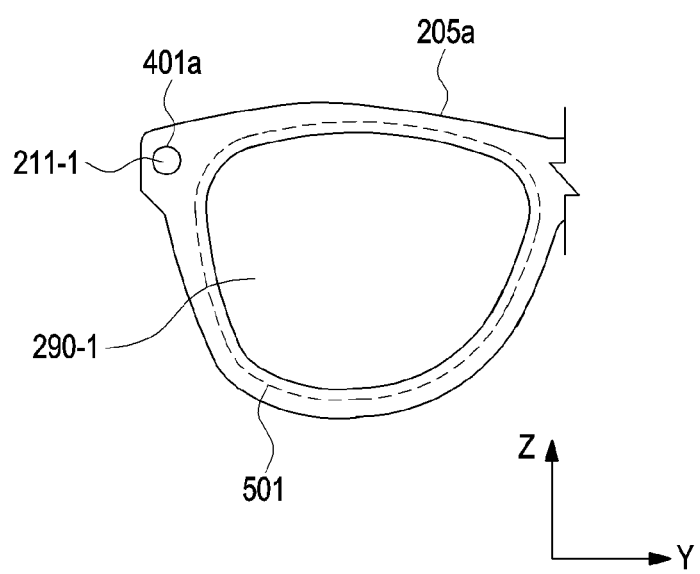
FIG. 7 is a view illustrating another example of placement of a transmission coil of an electronic device according to an embodiment of the disclosure.

FIG. 7 is a view illustrating another example of placement of a transmission coil of an electronic device according to an embodiment of the disclosure.

Referring to FIG. 7, according to various embodiments, an electronic device 200 may include a lens frame (e.g., the lens frame 205 of FIG. 2), a first transparent member 290-1, and a first camera 211-1 at least partially exposed to the outside through the first optical hole 401a.

According to various embodiments, the transmission coil 501 may be disposed in the lens frame 205 (e.g., the first part 205a) to surround the first transparent member 290-1 as viewed from one direction (e.g., the front direction). Although not shown, the electronic device 200 may further include another transmission coil disposed in the lens frame 205 (e.g., the second part 205b) to surround the second transparent member 290-2.

According to an embodiment, the electronic device 200 may further include at least one transmission coil described in connection with FIGS. 5A and/or 6A. For example, the electronic device 200 may include at least one transmission coil disposed in the lens frame 205 to surround the first transparent member 290-1 and/or the second transparent member 290-2 and at least one transmission coil disposed under the first optical hole 401a, the second optical hole 401b, and/or the third optical hole 401c.

According to various embodiments, the lens frame (e.g., the lens frame 511 of FIG. 5B) of the external electronic device (e.g., the external electronic device 510 of FIG. 5B) may be attached to the lens frame 205. According to various embodiments, the external electronic device 510 may include at least one reception coil, and the at least one reception coil may be disposed in the lens frame 511 to correspond to the position of at least one transmission coil (e.g., the transmission coil 501). For example, the at least one reception coil may be disposed in the lens frame 511 to surround at least one color-changing lens (e.g., the color-changing lens 513 or the first and second color-changing lenses 513a and 513b of FIG. 5B).

Figure 8A:
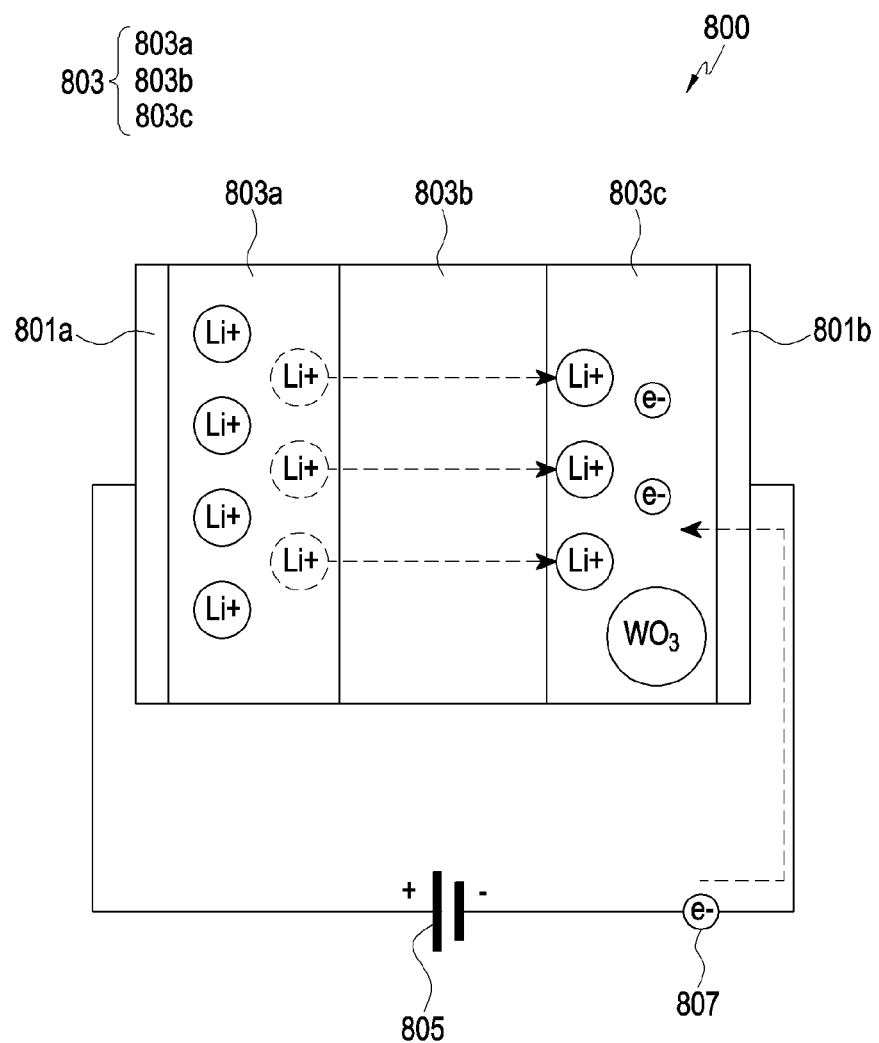
FIG. 8A illustrates a structure of a color-changing lens according to an embodiment of the disclosure.

FIG. 8A illustrates a structure of a color-changing lens according to an embodiment of the disclosure.

Figure 8B:
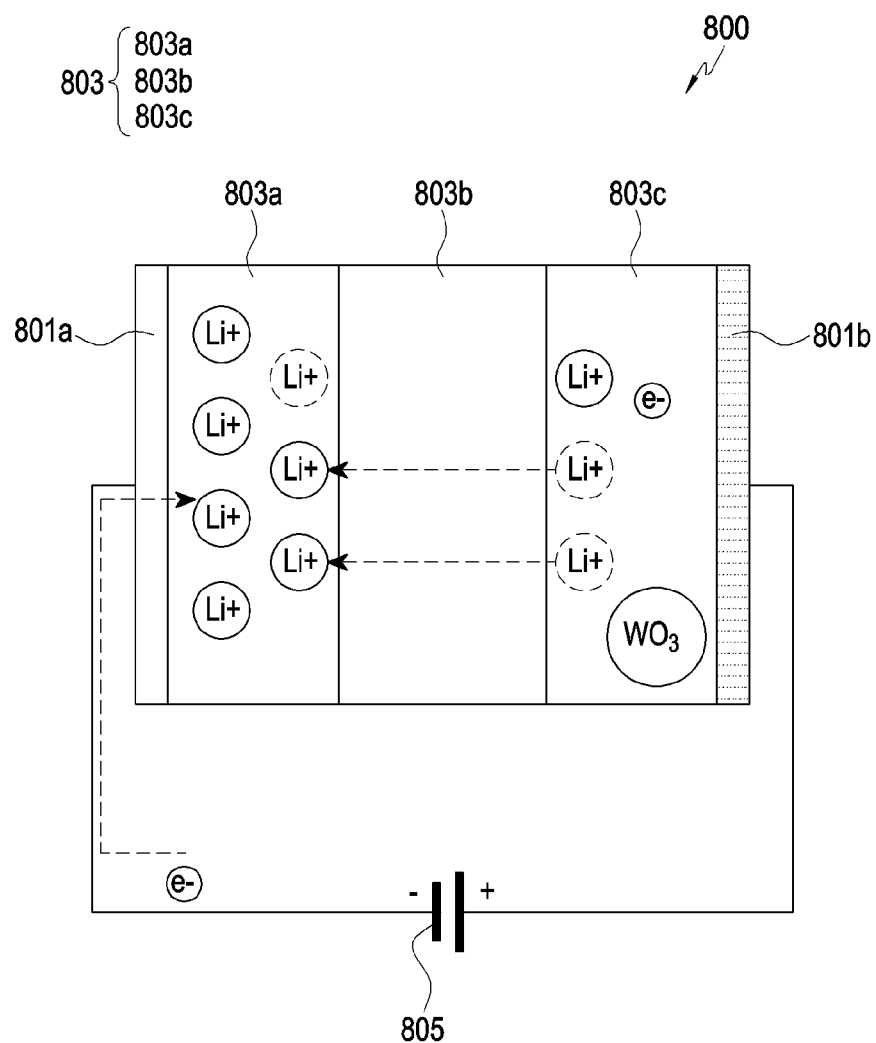
FIG. 8B illustrates a structure of a color-changing lens according to an embodiment of the disclosure.

FIG. 8B illustrates a structure of a color-changing lens according to an embodiment of the disclosure.

According to various embodiments, a color-changing lens 800 may be included in the electronic device (e.g., the electronic device 200 of FIG. 2) or the external electronic device (e.g., the external electronic device 510 of FIG. 5B). For example, the color-changing lens 800 may be included in each of the transparent members 290-1 and 290-2 of the electronic device 200. For example, the color-changing lens 800 may denote the color-changing lens 513 of the external electronic device 510.

According to various embodiments, the color-changing lens 800 may include a first electrode 801a, a second electrode 801b, and a plurality of layers 803. Reference number 805 illustrates the output of at least one driving circuit of the electronic device 200 or the output of at least one driving circuit of the external electronic device 510, as a voltage source.

According to various embodiments, the first electrode 801a and the second electrode 801b may include a transparent electrode. For example, the first electrode 801a and the second electrode 801b may be formed of an indium tin oxide (ITO) electrode.

According to various embodiments, the at least one driving circuit may apply a voltage to the first electrode 801a or the second electrode 801b. For example, as in the case of FIG. 8A, at least one driving circuit may apply a positive voltage to the first electrode 801a. In this case, the at least one driving circuit may connect the second electrode 801b to a ground (GND) or apply a negative voltage to the second electrode 801b. For example, as in the case of FIG. 8B, at least one driving circuit may apply a positive voltage to the second electrode 801b. In this case, the at least one driving circuit may connect the first electrode 801a to the ground or apply a negative voltage to the first electrode 801a. According to various embodiments, two or more switching elements may be disposed between the first electrode 801a and the second electrode 801b and at least one driving circuit. In describing various embodiments of the disclosure, applying a forward voltage to the color-changing lens 800 may mean applying a voltage to the first electrode 801a and the second electrode 801b so that the potential of the first electrode 801a is higher than that of the second electrode 801b (e.g., the case shown in FIG. 8A). In describing various embodiments of the disclosure, applying a reverse voltage to the color-changing lens 800 may mean applying a voltage to the first electrode 801a and the second electrode 801b so that the potential of the first electrode 801a is lower than that of the second electrode 801b (e.g., the case shown in FIG. 8B).

According to various embodiments, the plurality of layers 803 may include an ion storage layer 803a, an electrolyte layer 803b, and an electrochromic layer 803c. According to various embodiments, lithium ions ($Li^+$) may be included in the ion storage layer 803a. According to various embodiments, at least one tungsten (e.g., tungsten trioxide ($WO_3$)) may be included in the electrochromic layer 803c. According to various embodiments, at least one lithium ion ($Li^+$) may be moved through the electrolyte layer 803b.

Referring to FIG. 8A, if a forward voltage is applied to the color-changing lens 800, at least one electron 807 may move to the electrochromic layer 803c through the voltage source 805, and at least one of the lithium ions ($Li^+$) included in the ion storage layer 803a may move to the electrochromic layer 803c through the electrolyte layer 803b. In this case, the electrons moved to the electrochromic layer 803c may absorb photons introduced from the outside, so that the transmittance of the electrochromic layer 803c may be reduced (e.g., tinted). As the time during which the forward voltage is applied to the color-changing lens 800 increases and/or the magnitude of the applied forward voltage increases, the transmittance of the electrochromic layer 803c may be further lowered. If the application of the forward voltage to the color-changing lens 800 is stopped, the transmittance of the electrochromic layer 803c may gradually increase (e.g., within a few minutes).

Referring to FIG. 8B, if a reverse voltage is applied to the color-changing lens 800, at least one electron 807 moves from the electrochromic layer 803c to the ion storage layer 803a through the voltage source 805, and at least one of the lithium ions ($Li^+$) included in the electrochromic layer 803c may move to the ion storage layer 803a through the electrolyte layer 803b. The number of electrons absorbing photons introduced from the outside in the electrochromic layer 803c is reduced, so that the transmittance of the electrochromic layer 803c may be increased (e.g., untinted). If a reverse voltage is applied to the color-changing lens 513, the transmittance of the electrochromic layer 803c may be rapidly increased (e.g., within several ms or several seconds). As the time during which the reverse voltage is applied to the color-changing lens 800 increases and/or the magnitude of the applied reverse voltage increases, the transmittance of the electrochromic layer 803c may be deceased more rapidly.

According to various embodiments, if the color-changing lens 800 is a lens whose transmittance is simultaneously adjusted over the entire area, a forward voltage or a reverse voltage may be applied to the color-changing lens 800 through one first electrode 801a and one second electrode 801b.

According to various embodiments, if the color-changing lens 800 is a lens whose transmittance may be adjusted partially in at least a partial area of the entire area, a plurality of first electrodes and a plurality of second electrode crossing each other may be included in the color-changing lens 800, and a forward voltage or a reverse voltage may be applied to at least one of the plurality of first electrodes and at least one of the plurality of second electrodes.

According to various embodiments, each of the ion storage layer 803a, the electrolyte layer 803b, and the electrochromic layer 803c may form one plane, and the ion storage layer 803a, the electrolyte layer 803b and the electrochromic layer 803c may be stacked one over another. According to an embodiment, if the color-changing lens 800 is a lens whose transmittance may be adjusted partially in at least a partial area of the entire area, each of the ion storage layer 803a, the electrolyte layer 803b, and the electrochromic layer 803c may be formed in the form of a cell (e.g., a square) corresponding to each of the intersections between the plurality of first electrodes and the plurality of second electrodes. More specifically, cell units of the ion storage layer 803a, the electrolyte layer 803b, and the electrochromic layer 803c may be stacked one over another, corresponding to the intersection between any one first electrode and any one second electrode, and they may be stacked in the same manner, at the intersections between the other first electrodes and the other second electrodes, so that each of the ion storage layer 803a, the electrolyte layer 803b, and the electrochromic layer 803c may be formed as a layer in a grating pattern.

Figure 9:
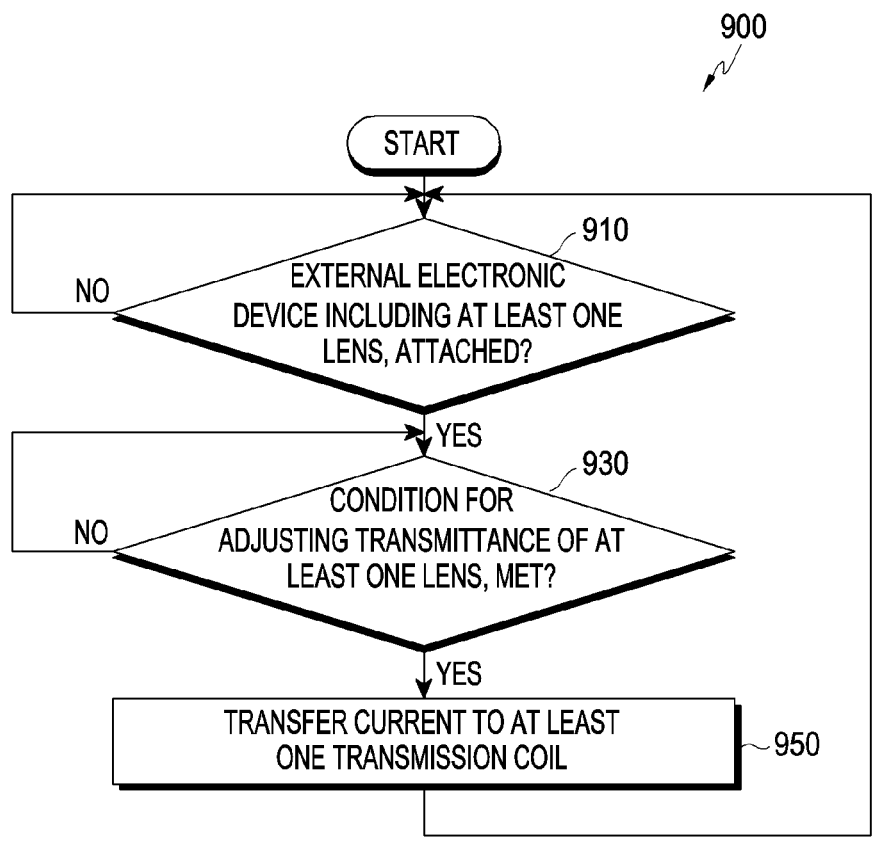
FIG. 9 is a flowchart illustrating a method for controlling the transmittance of an external electronic device by an electronic device according to an embodiment of the disclosure.

FIG. 9 is a flowchart 900 illustrating a method for controlling the transmittance of an external electronic device (e.g., the external electronic device 510 of FIG. 5B) by an electronic device (e.g., the electronic device 200 of FIG. 2) according to an embodiment of the disclosure.

Referring to FIG. 9, according to various embodiments, in operation 910, the electronic device 200 may identify whether the external electronic device 510 including at least one lens (e.g., the color-changing lens 513 of FIG. 5B) is attached. For example, the external electronic device 510 may include one or more magnetic substances (e.g., the magnetic substance 517 of FIG. 5B), and the electronic device 200 may detect whether one or more magnetic substances (e.g., the magnetic substance 517) is proximate using a hall sensor (e.g., the sensor 503 of FIG. 5A) to thereby identify whether the external electronic device 510 is attached to the lens frame (e.g., the lens frame 205 of FIG. 2). According to an embodiment, the external electronic device 510 may include a fastening member for coupling to the lens frame 205 and/or the wearing member (e.g., the wearing member 201 or 202 of FIG. 2).

According to various embodiments, upon failing to identify that the external electronic device 510 including at least one lens (e.g., the color-changing lens 513) is attached, the electronic device 200 may perform operation 910 again.

According to various embodiments, upon identifying that the external electronic device 510 including at least one lens (e.g., the color-changing lens 513) is attached, the electronic device 200 may identify whether a condition for adjusting the transmittance of the at least one lens (e.g., the color-changing lens 513) is met in operation 930. For example, the electronic device 200 may identify the external illuminance (or ambient brightness) using at least one illuminance sensor (e.g., the sensor module 176 of FIG. 1). As another example, the electronic device 200 may identify external illuminance using at least one camera (e.g., the first cameras 211-1 and 211-2 and/or the third camera 213 of FIG. 2). The electronic device 200 may identify whether the condition for adjusting the transmittance of at least one lens (e.g., the color-changing lens 513) is met based on the identified external illuminance. For example, upon identifying that the external illuminance is a threshold or more (e.g., when the surroundings are bright), the electronic device 200 may identify that a first condition for reducing the transmittance of at least one lens (e.g., the color-changing lens 513) is met. For example, upon identifying that the external illuminance is less than the threshold (e.g., when the surroundings are dark), the electronic device 200 may identify that a second condition for increasing the transmittance of the at least one lens (e.g., the color-changing lens 513) is met. According to an embodiment, the electronic device 200 may identify the external illuminance every designated interval and, upon identifying that the difference between the external illuminance identified at a first time and the external illuminance identified at a second time, which is the designated interval after the first time, is less than a threshold difference, the electronic device 200 may identify that the condition for adjusting the transmittance of the at least one lens (e.g., the color-changing lens 513) is not met. According to another embodiment, the above-described thresholds may differ. For example, upon identifying that the external illuminance is a first threshold or more, the electronic device 200 may identify that the first condition for decreasing the transmittance of the at least one lens (e.g., the color-changing lens 513) is met and, upon identifying that the external illuminance is less than a second threshold smaller than the first threshold, the electronic device 200 may identify that the second condition for increasing the transmittance of the at least one lens (e.g., the color-changing lens 513) is met. Upon identifying that the external illuminance is the second threshold or more and less than the first threshold, the electronic device 200 may identify that the condition for adjusting the transmittance of the at least one lens (e.g., the color-changing lens 513) is not met.

According to various embodiments, upon identifying that the condition for adjusting the transmittance of the at least one lens (e.g., the color-changing lens 513) is not met, the electronic device 200 may perform operation 930 again. For example, the electronic device 200 may control the power transmission circuit to transfer no current to at least one transmission coil (e.g., the transmission coil 501) (e.g., to stop the operation of transferring current). According to an embodiment, upon identifying that the condition for adjusting the transmittance of the at least one lens (e.g., the color-changing lens 513) is not met, the electronic device 200 may periodically perform operation 930. For example, the electronic device 200 may periodically perform operation 930 until attachment of the external electronic device 510 including at least one lens (e.g., the color-changing lens 513) is not identified.

According to various embodiments, upon identifying that the condition for adjusting the transmittance of the at least one lens (e.g., the color-changing lens 513) is met, the electronic device 200 may transfer current to at least one transmission coil (e.g., the transmission coil 501 of FIG. 5A) in operation 950. For example, the electronic device 200 may control the power transmission circuit to transfer current to the at least one transmission coil (e.g., the transmission coil 501). According to an embodiment, the electronic device 200 may perform at least one operation to determine the transmittance, to be adjusted, of the at least one lens (e.g., the color-changing lens 513) according to the met condition (e.g., the above-described first condition or second condition), which is described below in greater detail with reference to the drawings.

According to various embodiments, after performing operation 950, the electronic device 200 may again perform operation 910 and its subsequent operations. According to various embodiments, upon failing to identify attachment of the external electronic device 510 (e.g., upon identifying detachment of the external electronic device 510) in operation 910, the electronic device 200 may control the power transmission circuit not to transfer current to the at least one transmission coil (e.g., the transmission coil 501) (e.g., to stop the operation of transferring current). According to an embodiment, after performing operation 950, the electronic device 200 may perform operation 930 without performing operation 910.

According to an embodiment, the electronic device 200 may control the transmittance of the color-changing lens (e.g., the color-changing lens 800 of FIGS. 8A and 8B) included in each of the transparent members (e.g., the transparent members 290-1 and 290-2 of FIG. 2) based on the external illuminance. For example, if the first condition for increasing the transmittance is met, the electronic device 200 may decrease the transmittance for at least a partial area of at least one of the color-changing lenses included in the transparent members (e.g., 290-1 and 290-2). For example, if the first condition for increasing the transmittance is met, the electronic device 200 may increase the transmittance for at least a partial area of at least one of the color-changing lenses included in the transparent members (e.g., 290-1 and 290-2).

Figure 10:
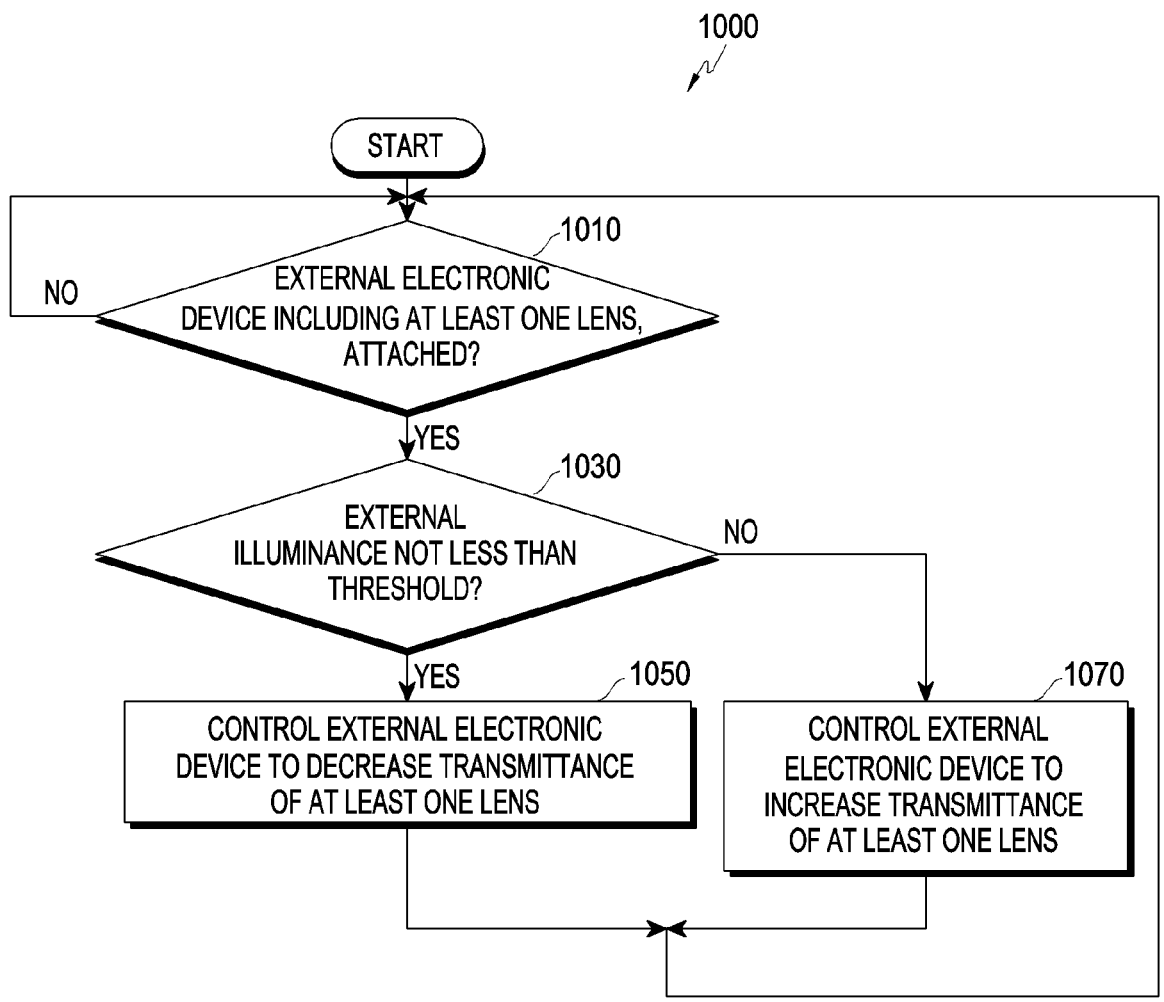
FIG. 10 is a flowchart illustrating a method for controlling the transmittance of an external electronic device by an electronic device according to an embodiment of the disclosure.

FIG. 10 is a flowchart illustrating a method for controlling the transmittance of an external electronic device (e.g., the external electronic device 510 of FIG. 5B) by an electronic device (e.g., the electronic device 200 of FIG. 2) according to an embodiment of the disclosure.

Referring to FIG. 10, according to various embodiments, in a method 1000, in operation 1010, the electronic device 200 may identify whether the external electronic device 510 including at least one lens (e.g., the color-changing lens 513 of FIG. 5B) is attached.

According to various embodiments, upon failing to identify that the external electronic device 510 including at least one lens (e.g., the color-changing lens 513) is attached, the electronic device 200 may perform operation 1010 again.

According to various embodiments, upon identifying attachment of the external electronic device 510 including at least one lens 513, the electronic device 200 may identify whether the external illuminance is a threshold or more in operation 1030.

According to various embodiments, upon identifying that the external illuminance is the threshold or more (e.g., when the surroundings are bright), the electronic device 200 may control the external electronic device 510 to decrease the transmittance of the at least one lens (e.g., the color-changing lens 513) in operation 1050. For example, the electronic device 200 may include an electromagnet and transmit a first control signal to the external electronic device 510 through the electromagnet. For example, the electronic device 200 may transmit the first control signal n times (e.g., once) within a designated time or may transmit the first control signal during first duration. As another example, the electronic device 200 may transmit the first control information (e.g., control information to apply a forward voltage) to the external electronic device 510 using the communication circuit (e.g., the communication module 190 of FIG. 1). According to an embodiment, the electronic device 200 may determine the duration during which the external electronic device 510 is to apply a forward voltage to the at least one lens (e.g., the color-changing lens 513) based on the identified external illuminance. For example, the electronic device 200 may determine to increase the duration during which the forward voltage is to be applied as the identified external illuminance increases and to decrease the duration during which the forward voltage is to be applied as the identified external illuminance decreases. According to an embodiment, the electronic device 200 may transfer current to at least one transmission coil (e.g., the transmission coil 501 of FIG. 5A) during the determined duration. According to an embodiment, the electronic device 200 may periodically repeat the operation of transferring current during the determined duration. For example, the electronic device 200 may control the power transmission circuit to transfer current to the at least one transmission coil (e.g., the transmission coil 501) during the determined duration, every designated period. According to another embodiment, the electronic device 200 may include information about the determined duration in the first control information and transmit the first control information to the external electronic device 510. According to an embodiment, if the at least one lens (e.g., the color-changing lens 513) included in the external electronic device 510 is a lens (e.g., a liquid crystal (LC) lens) that lacks a memory effect, the electronic device 200 may determine the transmittance of the at least one lens (e.g., the color-changing lens 513) based on the identified external illuminance and periodically transfer current to the at least one transmission coil (e.g., the transmission coil 501) so that the transmittance of the at least one lens (e.g., the color-changing lens 513) is maintained as the determined transmittance.

According to various embodiments, upon identifying that the external illuminance is less than the threshold (e.g., when the surroundings are dark), the electronic device 200 may control the external electronic device 510 to increase the transmittance of the at least one lens (e.g., the color-changing lens 513) in operation 1070. For example, the electronic device 200 may transfer current to the at least one lens (e.g., the color-changing lens 513) without transmitting the first control signal to the external electronic device 510 through the electromagnet. Alternatively, the electronic device 200 may transmit the first control signal to the external electronic device 510 through the electromagnet, m times (e.g., twice), within designated duration, or transmit the first control signal during the second duration and then transfer current to the at least one transmission coil (e.g., the transmission coil 501). As another example, the electronic device 200 may transmit the second control information (e.g., control information to apply a reverse voltage) to the external electronic device 510 using the communication circuit (e.g., the communication module 190) and then transfer current to the at least one transmission coil (e.g., the transmission coil 501). According to an embodiment, the electronic device 200 may determine the duration during which the external electronic device 510 is to apply a reverse voltage to the at least one lens (e.g., the color-changing lens 513) based on the identified external illuminance. For example, the electronic device 200 may determine to decrease the duration during which the reverse voltage is to be applied as the identified external illuminance increases and to increase the duration during which the reverse voltage is to be applied as the identified external illuminance decreases. According to an embodiment, the electronic device 200 may transfer current to at least one transmission coil (e.g., the transmission coil 501) during the determined duration. According to another embodiment, the electronic device 200 may include information about the determined duration in the second control information and transmit the first control information to the external electronic device 510.

According to various embodiments, after performing operation 1070, the electronic device 200 may again perform operation 1010 and its subsequent operations. According to an embodiment, after performing operation 1070, the electronic device 200 may perform operation 1030 without performing operation 1010. According to various embodiments, the electronic device 200 may perform operations 1010 to 1070 until attachment of the external electronic device 510 including at least one lens (e.g., the color-changing lens 513) is not identified (e.g., until detachment of the external electronic device 510 is identified).

Figure 11A:
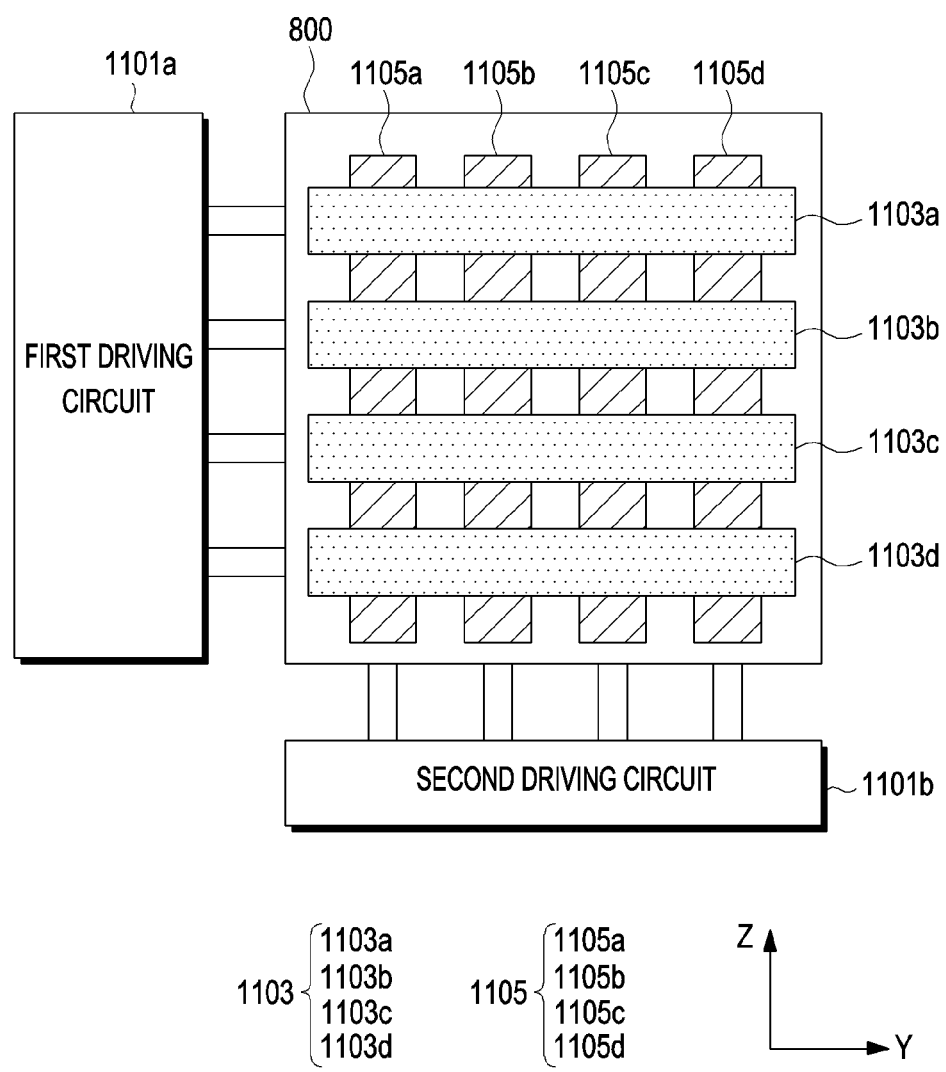
FIG. 11A is a view illustrating a method for controlling at least one lens by an electronic device or an external electronic device according to an embodiment of the disclosure.

FIG. 11A is a view illustrating a method for controlling at least one lens (e.g., the color-changing lens 800 of FIGS. 8A and 8B) by an electronic device (e.g., the electronic device 200 of FIG. 2) or an external electronic device (e.g., the external electronic device 510 of FIG. 5B) according to an embodiment of the disclosure.

Figure 11B:
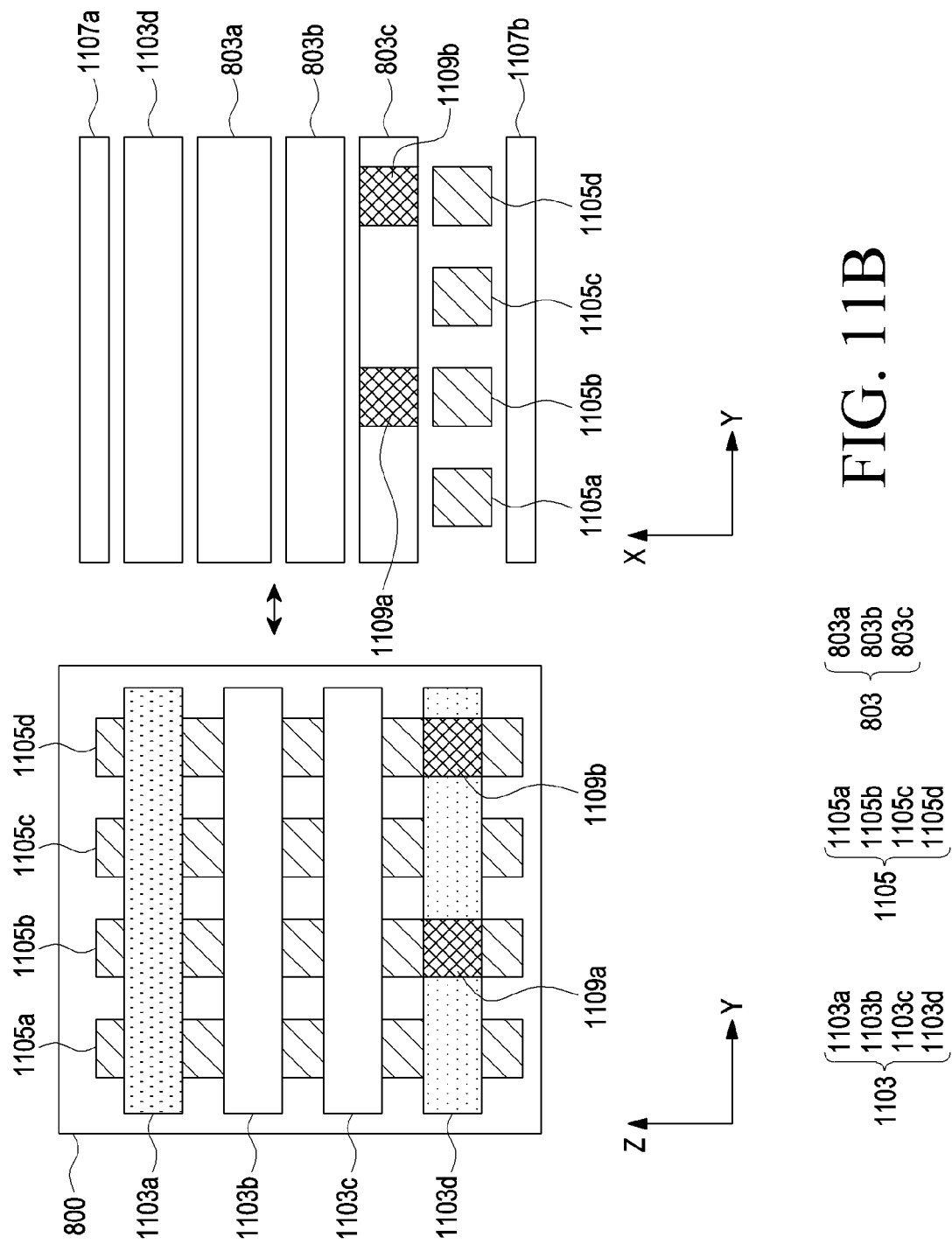
FIG. 11B is a view illustrating a method for controlling at least one lens by an electronic device or an external electronic device according to an embodiment of the disclosure.

FIG. 11B is a view illustrating a method for controlling at least one lens (e.g., the color-changing lens 800) by an electronic device or an external electronic device according to an embodiment of the disclosure.

Referring to FIGS. 11A and 11B, according to various embodiments, the electronic device 200 or the external electronic device 510 may include a first driving circuit 1101a, a second driving circuit 1101b, and a color-changing lens 800 including each of a plurality of transparent electrodes 1103 and 1105.

According to various embodiments, when the color-changing lens 800 is included in the electronic device 200, the first driving circuit 1101a and the second driving circuit 1101b may be connected with each of the power management module 188 and/or the battery 189 of FIG. 1. For example, the first driving circuit 1101a and the second driving circuit 1101b may receive power from the power management module 188 and the battery 189.

According to various embodiments, when the color-changing lens 800 is included in the external electronic device 510, the first driving circuit 1101a and the second driving circuit 1101b may be connected with each of at least one sensor (e.g., a hall sensor) and/or communication circuit of the external electronic device 510. For example, the first driving circuit 1101a and the second driving circuit 1101b may receive a sensing signal from at least one sensor (e.g., a hall sensor). For example, the first driving circuit 1101a and the second driving circuit 1101b may receive a second control signal from the communication circuit. According to various embodiments, the first driving circuit 1101a and the second driving circuit 1101b may receive power from the power reception circuit of the external electronic device 510.

According to various embodiments, the plurality of transparent electrodes 1103 and 1105 may include a plurality of first transparent electrodes 1103 (e.g., the first electrodes 801a of FIG. 8A) and a plurality of second transparent electrodes 1105 (e.g., the second electrode 801b of FIG. 8A). According to various embodiments, the plurality of first transparent electrodes 1103a, 1103b, 1103c, and 1103d and the plurality of second transparent electrodes 1105a, 1105b, 1105c, and 1105d may be disposed to cross each other.

Referring to FIG. 11B, according to various embodiments, the plurality of first transparent electrodes 1103 may be disposed on a first surface, and the plurality of second transparent electrodes 1105 may be disposed on the second surface. According to various embodiments, a plurality of layers 803 (e.g., the ion storage layer 803a, the electrolyte layer 803b, and the electrochromic layer 803c) may be included between the first surface where the plurality of first transparent electrodes 1103 are disposed and the second surface where the plurality of second transparent electrodes 1105 are disposed. According to various embodiments, a first transparent substrate 1107a may be included on an outer side (e.g., upper side) of the first surface where the plurality of first transparent electrodes 1103 are disposed. According to various embodiments, a second transparent substrate 1107*b* may be included on an outer side (e.g., lower side) of the second surface where the plurality of second transparent electrodes 1105 are disposed.

According to various embodiments, the first driving circuit 1101*a* and the second driving circuit 1101*b* may apply voltage to at least one of the plurality of first transparent electrodes 1103 and at least one of the plurality of second transparent electrodes 1105 based on the power from the power reception circuit.

According to various embodiments, the first driving circuit 1101*a* may apply a positive voltage to at least one of the plurality of first transparent electrodes 1103. According to various embodiments, the first driving circuit 1101*a* may connect at least one of the plurality of first transparent electrodes 1103 to the ground or apply a negative voltage to at least one of the plurality of first transparent electrodes 1103.

According to various embodiments, the second driving circuit 1101*b* may apply a positive voltage to at least one of the plurality of second transparent electrodes 1105. According to various embodiments, the second driving circuit 1101*b* may connect at least one of the plurality of second transparent electrodes 1105 to the ground or apply a negative voltage to at least one of the plurality of second transparent electrodes 1105.

According to various embodiments, the transmittance for at least a partial area of the color-changing lens 800 may be adjusted based on the potential difference between at least one of the plurality of first transparent electrodes 1103 and at least one of the plurality of second transparent electrodes 1105. For example, referring to FIG. 11B, if the first driving circuit 1101*a* applies a positive voltage to the first transparent electrode 1103*d*, and the second driving circuit 1101*b* connects the second transparent electrode 1105*b* to the ground or applies a negative voltage to the second transparent electrode 1105*b*, the transmittance of the portion 1109*a* of the electrochromic layer 803*c* corresponding to the intersection between the first transparent electrode 1103*d* and the second transparent electrode 1105*b* may be decreased. Thus, the transmittance of the partial area of the color-changing lens 513, corresponding to the portion 1109*a* of the electrochromic layer 803*c* may be decreased. For example, if the first driving circuit 1101*a* applies a positive voltage to the first transparent electrode 1103*d*, and the second driving circuit 1101*b* connects the second transparent electrode 1105*d* to the ground or applies a negative voltage to the second transparent electrode 1105*d*, the transmittance of the portion 1109*b* of the electrochromic layer 803*c* corresponding to the intersection between the first transparent electrode 1103*d* and the second transparent electrode 1105*d* may be decreased. Thus, the transmittance of the partial area of the color-changing lens 513, corresponding to the portion 1109*b* of the electrochromic layer 803*c* may be decreased. Thereafter, if the first driving circuit 1101*a* connects the first transparent electrode 1103*d* to the ground or applies a negative voltage to the first transparent electrode 1103*d*, or the second driving circuit 1101*b* applies a positive voltage to the second transparent electrode 1105*d*, the transmittance of the portion 1109*a* of the electrochromic layer 803*c* corresponding to the intersection between the first transparent electrode 1103*d* and the second transparent electrode 1105*d* may be increased. Similarly, if the first driving circuit 1101*a* connects the first transparent electrode 1103*d* to the ground or applies a negative voltage to the first transparent electrode 1103*d*, or the second driving circuit 1101*b* applies a positive voltage to the second transparent electrode 1105*d*, the transmittance of the portion 1109*b* of the electrochromic layer 803*c* corresponding to the intersection between the first transparent electrode 1103*d* and the second transparent electrode 1105*d* may be increased.

Figure 12:
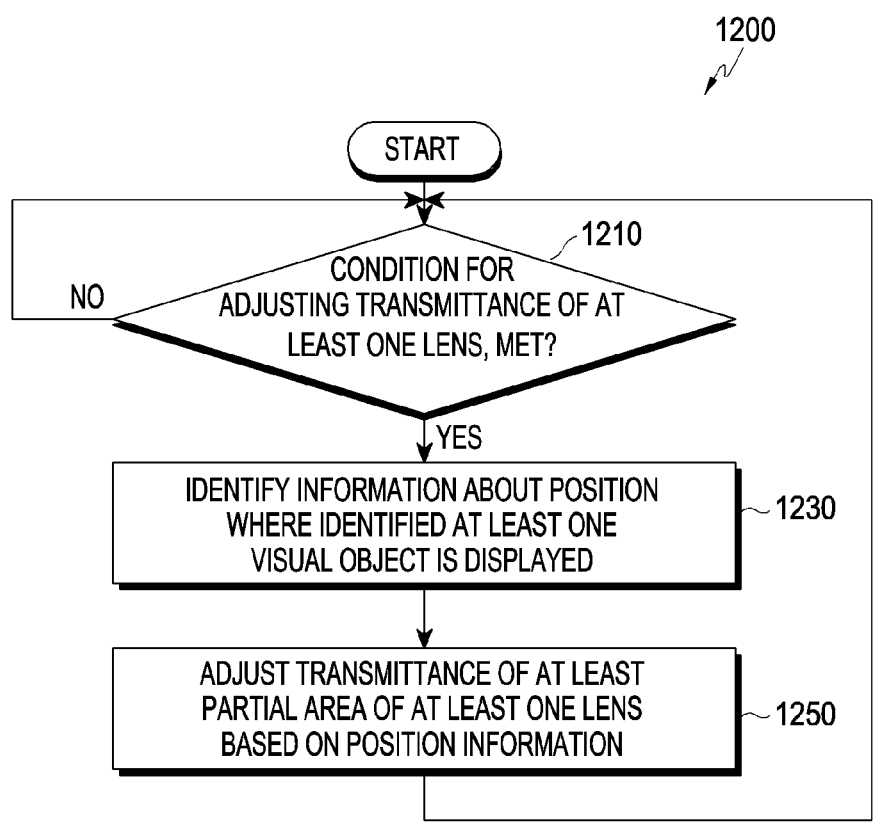
FIG. 12 is a flowchart illustrating a method for adjusting the transmittance for a partial area of at least one lens by an electronic device according to an embodiment of the disclosure.

FIG. 12 is a flowchart illustrating a method for adjusting the transmittance for a partial area of at least one lens (e.g., the color-changing lens 800 of FIGS. 8A and 8B) by an electronic device (e.g., the electronic device 200 of FIG. 2) according to an embodiment of the disclosure.

Referring to FIG. 12, according to various embodiments, in a method 1200, the electronic device 200 may identify whether a condition for adjusting the transmittance of the at least one lens (e.g., the color-changing lens 800 included in the electronic device 200) is met. For example, the electronic device 200 may identify the external illuminance using at least one illuminance sensor (e.g., the sensor module 176 of FIG. 1) and/or at least one camera (e.g., the first cameras 211-1 and 211-2 and/or third camera 213 of FIG. 2). The electronic device 200 may identify whether the condition for adjusting the transmittance of at least one lens (e.g., the color-changing lens 800) is met based on the identified external illuminance. For example, upon identifying that the external illuminance is a threshold or more (e.g., when the surroundings are bright), the electronic device 200 may identify that a first condition for reducing the transmittance of at least one lens (e.g., the color-changing lens 800) is met. For example, upon identifying that the external illuminance is less than the threshold (e.g., when the surroundings are dark), the electronic device 200 may identify that a second condition for increasing the transmittance of the at least one lens (e.g., the color-changing lens 800) is met. According to an embodiment, the electronic device 200 may identify the external illuminance every designated interval and, upon identifying that the difference between the external illuminance identified at a first time and the external illuminance identified at a second time, which is the designated interval after the first time, is less than a threshold difference, the electronic device 200 may identify that the condition for adjusting the transmittance of the at least one lens (e.g., the color-changing lens 800) is not met. According to another embodiment, the above-described thresholds may differ. For example, upon identifying that the external illuminance is a first threshold or more, the electronic device 200 may identify that the first condition for decreasing the transmittance of the at least one lens (e.g., the color-changing lens 800) is met and, upon identifying that the external illuminance is less than a second threshold smaller than the first threshold, the electronic device 200 may identify that the second condition for increasing the transmittance of the at least one lens (e.g., the color-changing lens 800) is met. Upon identifying that the external illuminance is the second threshold or more and less than the first threshold, the electronic device 200 may identify that the condition for adjusting the transmittance of the at least one lens (e.g., the color-changing lens 800) is not met.

According to various embodiments, upon identifying that the condition for adjusting the transmittance of the at least one lens (e.g., the color-changing lens 800) is not met, the electronic device 200 may perform operation 1210 again.

According to various embodiments, upon identifying that the condition for adjusting the transmittance of the at least one lens (e.g., the color-changing lens 800) is met, the electronic device 200 may identify information about the position where at least one visual object is displayed in operation 1230. For example, the electronic device 200 may display a visual object on at least one of transparent members (e.g., the transparent members 290-1 and 290-2 of FIG.

2) using a first display (e.g., the first display 251 of FIG. 2) and/or a second display (e.g., the second display 252 of FIG. 2). The electronic device 200 may identify information (e.g., pixel information or coordinate information) about the position of each of at least one visual object (e.g., indicating the position) displayed on the transparent members 290-1 and 290-2.

According to various embodiments, in operation 1250, the electronic device 200 may adjust the transmittance of at least a partial area of at least one lens (e.g., the color-changing lens 800) based on the identified position information. For example, the electronic device 200 may adjust the transmittance of at least a partial area of at least one lens (e.g., the color-changing lens 800) corresponding to the position where the at least one visual object is displayed, based on the identified position information. For example, the at least a partial area whose transmittance is adjusted may overlap the area where at least one object is displayed, as viewed in one direction (e.g., the front direction (e.g., the −X direction of FIG. 2) of the lens frame (e.g., the lens frame 205 of FIG. 2) of the electronic device 200) (e.g., including (or covering) the area where at least one object is displayed). According to an embodiment, the electronic device 200 may identify the external illuminance and determine the degree of adjustment of increasing or decreasing the transmittance of at least a partial area of at least one lens (e.g., the color-changing lens 800) based on the identified external illuminance. For example, if the external illuminance is a threshold (or a first threshold) or more, the electronic device 200 may apply a forward voltage to at least one of the first transparent electrodes (e.g., the first transparent electrode 1103*d* of FIG. 11A) and at least one of the second transparent electrodes (e.g., the second transparent electrode 1105*d* of FIG. 11A), corresponding to at least a partial area of the at least one lens (e.g., the color-changing lens 800), for longer duration, as the identified external illuminance increases. For example, if the external illuminance is less than the threshold (or a second threshold), the electronic device 200 may apply a reverse voltage to at least one of the first transparent electrodes (e.g., the first transparent electrode 1103*d* of FIG. 11A) and at least one of the second transparent electrodes (e.g., the second transparent electrode 1105*d* of FIG. 11A), corresponding to at least a partial area of the at least one lens (e.g., the color-changing lens 800), for longer duration, as the identified external illuminance decreases.

Figure 13:
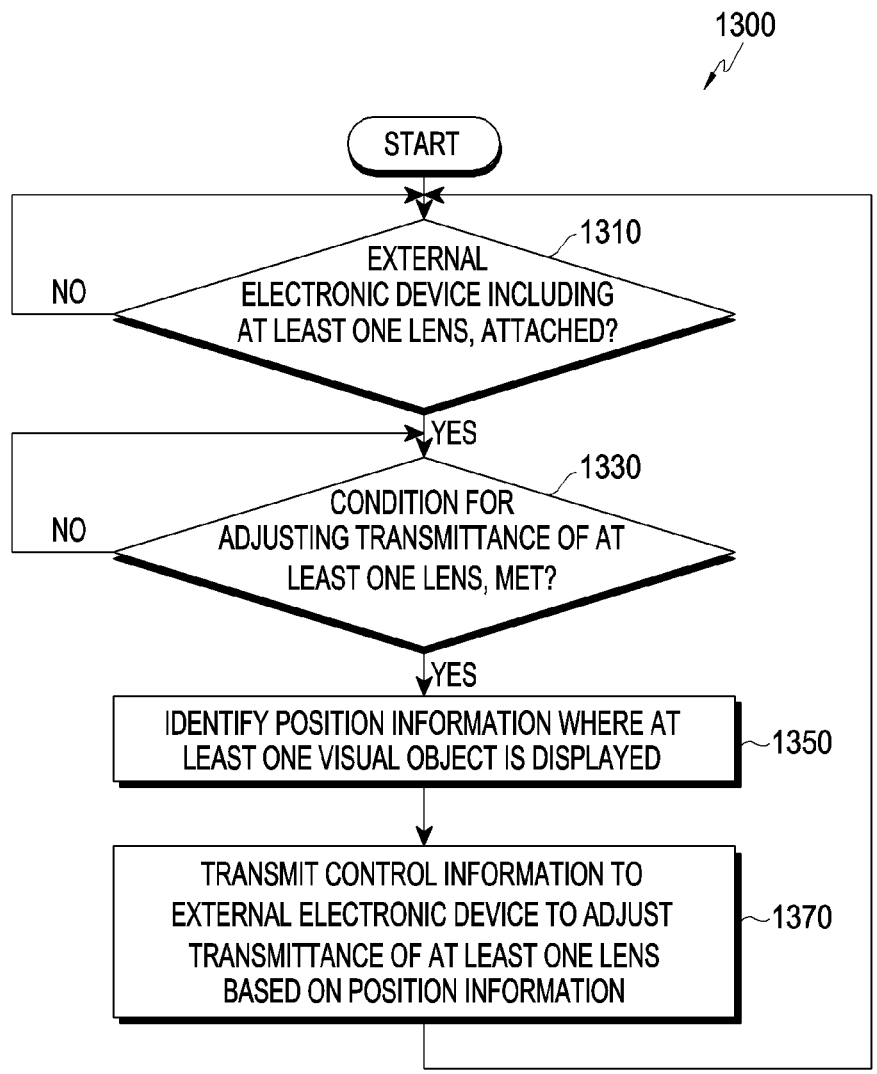
FIG. 13 is a flowchart illustrating a method for adjusting the transmittance for a partial area of at least one lens included in an external electronic device by an electronic device according to an embodiment of the disclosure.

FIG. 13 is a flowchart illustrating a method for adjusting the transmittance of a partial area of at least one lens (e.g., the color-changing lens 800 of FIGS. 8A and 8B) included in an external electronic device (e.g., the external electronic device 510 of FIG. 5B) by an electronic device (e.g., the electronic device 200 of FIG. 2) according to an embodiment of the disclosure.

Referring to FIG. 13, according to various embodiments, in a method 1300, in operation 1310, the electronic device 200 may identify whether the external electronic device 510 including at least one lens (e.g., the color-changing lens 800) is attached.

According to various embodiments, upon failing to identify that the external electronic device 510 including at least one lens (e.g., the color-changing lens 800) is attached, the electronic device 200 may perform operation 1310 again.

According to various embodiments, upon identifying that the external electronic device 510 including at least one lens (e.g., the color-changing lens 800) is attached, the electronic device 200 may identify whether a condition for adjusting the transmittance of the at least one lens (e.g., the color-changing lens 800) is met in operation 1330.

According to various embodiments, upon identifying that the condition for adjusting the transmittance of the at least one lens (e.g., the color-changing lens 800) is not met, the electronic device 200 may perform operation 1330 again. According to various embodiments, upon identifying that the condition for adjusting the transmittance of the at least one lens (e.g., the color-changing lens 800) is not met, the electronic device 200 may perform operation 1310 again.

According to various embodiments, upon identifying that the condition for adjusting the transmittance of the at least one lens (e.g., the color-changing lens 800) is met, the electronic device 200 may identify information about the position where at least one visual object is displayed in operation 1350. For example, the electronic device 200 may display a visual object on at least one of transparent members (e.g., the transparent members 290-1 and 290-2 of FIG. 2) using a first display (e.g., the first display 251 of FIG. 2) and/or a second display (e.g., the second display 252 of FIG. 2). The electronic device 200 may identify information (e.g., pixel information or coordinate information) about the position of each of at least one visual object displayed on the transparent members 290-1 and 290-2.

According to various embodiments, in operation 1370, the electronic device 200 may transmit control information to the external electronic device 510 to adjust the transmittance of at least one lens (e.g., the color-changing lens 800) based on the identified position information. For example, the control information may include information about the area of the color-changing lens 800 whose transmittance is to be adjusted. For example, the area of the color-changing lens 800 whose transmittance is to be adjusted may correspond to the position where at least one visual object is displayed. For example, the area whose transmittance is adjusted may overlap the area where at least one object is displayed, as viewed in one direction (e.g., the front direction (e.g., the −X direction of FIG. 2) of the lens frame (e.g., the lens frame 511 of FIG. 5B) of the external electronic device 510) (e.g., including (or covering) the area where at least one object is displayed).

According to an embodiment, the electronic device 200 may identify the external illuminance and control the external electronic device 510 to adjust the transmittance of at least a partial area of at least one lens (e.g., the color-changing lens 800) based on the identified external illuminance. According to an embodiment, if the external illuminance is a threshold (or first threshold) or more, the electronic device 200 may transmit first control information (e.g., control information to apply a forward voltage) to the external electronic device 510 using the communication circuit (e.g., the communication module 190 of FIG. 1) and transfer current to at least one transmission coil (e.g., the transmission coil 501). For example, the first control information may be included in the control information of operation 1370. Alternatively, the electronic device 200 may transmit a first control signal using the electromagnet and transfer current to at least one transmission coil (e.g., the transmission coil 501). According to an embodiment, if the external illuminance is less than the threshold (or second threshold) or more, the electronic device 200 may transmit second control information (e.g., control information to apply a reverse voltage) to the external electronic device 510 using the communication circuit (e.g., the communication module 190 of FIG. 1) and transfer current to at least one transmission coil (e.g., the transmission coil 501). For example, the second control information may be included in the control information of operation 1370. Alternatively, the electronic device 200 may not transmit the first control signal using the electromagnet or may transmit the first control signal, a designated number of times (e.g., m times) and/or during duration (e.g., second duration) and transfer current to at least one transmission coil (e.g., the transmission coil 501 of FIG. 5A).

According to an embodiment, the electronic device 200 may identify the external illuminance and determine the degree of adjustment of increasing or decreasing the transmittance of at least a partial area of at least one lens (e.g., the color-changing lens 800) based on the identified external illuminance. For example, if the external illuminance is the threshold (or first threshold) or more, the electronic device 200 may transfer current to the at least one transmission coil (e.g., the transmission coil 501) during longer duration as the identified external illuminance increases. For example, if the external illuminance is less than the threshold (or second threshold), the electronic device 200 may transfer current to at least one transmission coil (e.g., the transmission coil 501) during longer duration as the identified external illuminance decreases.

Figure 14:
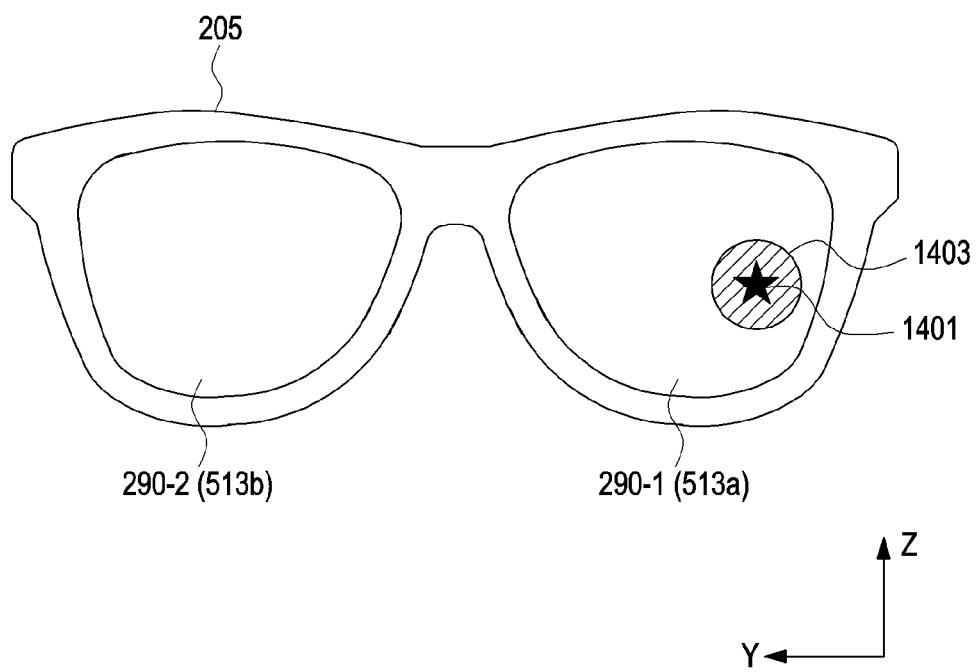
FIG. 14 illustrates an example in which the transmittance of a partial area of at least one lens is adjusted according to an embodiment of the disclosure.

FIG. 14 illustrates an example in which the transmittance of a partial area of at least one lens (e.g., the color-changing lens 800 of FIGS. 8A and 8B) is adjusted according to an embodiment the disclosure.

Referring to FIG. 14, according to various embodiments, the color-changing lens 800 of FIGS. 8A and 8B may be included in the transparent members 290-1 and 290-2 of the electronic device 200. According to various embodiments, the color-changing lens 800 of FIGS. 8A and 8B may be included in the first and second color-changing lenses 513*a* and 513*b* of the external electronic device 510.

According to various embodiments, the electronic device 200 may include a lens frame 205, a first transparent member 290-1, and a second transparent member 290-2. According to various embodiments, at least one visual object may be displayed on the first transparent member 290-1 and/or the second transparent member 290-2. For example, a visual object 1401 may be displayed through the first transparent member 290-1.

According to various embodiments, when the color-changing lens 800 of FIGS. 8A and 8B is included in the transparent members 290-1 and 290-2 of the electronic device 200, the electronic device 200 may adjust the transmittance of a partial area 1403 of the color-changing lens 800 corresponding to the visual object 1401 through the operations described in connection with FIG. 12.

According to various embodiments, when the color-changing lens 800 of FIGS. 8A and 8B is included in the external electronic device 510, the electronic device 200 may adjust the transmittance of at least a partial area 1403 of the first color-changing lens 513*a* corresponding to the first transparent member 290-1 which displays the visual object 1401 through the operations described in connection with FIG. 13.

As illustrated, at least the partial area 1403 may cover the area which displays the visual object 1401 as viewed in the front direction of the lens frame 205. Thus, it is possible to secure the visibility of the visual object 1401 while securing the visibility through the transparent members 290-1 and 290-2 by decreasing the transmittance only for the partial area 1403 corresponding to the position where the visual object 1401 is displayed in a bright ambient environment. It is possible to increase the visibility through the transparent members 290-1 and 290-2 while securing the visibility of the visual object 1401 by increasing again the transmittance only for the partial area 1403 corresponding to the position where the visual object 1401 is displayed in a dark ambient environment.

According to various embodiments, an electronic device may comprise a first transparent member and a second transparent member where at least one visual object is displayed, a lens frame receiving at least a portion of the first transparent member and at least a portion of the second transparent member, the lens frame configured to: allow an external electronic device including at least one color-changeable lens to be attached thereto, and allow the at least one color-changeable lens to be aligned with at least one of the first transparent member or the second transparent member if the external electronic device is attached to the lens frame, one or more wearing members extending from the lens frame or coupled to the lens frame, at least one camera disposed in the lens frame and at least partially exposed to an outside through at least one hole formed in the lens frame, at least one first transmission coil disposed adjacent to at least a portion of the at least one camera inside the lens frame, and a power transmission circuit configured to transfer a current to the at least one first transmission coil.

According to various embodiments, the at least one first transmission coil may be disposed to surround the at least one hole as viewed in a direction.

According to various embodiments, the at least one first transmission coil may be disposed within a designated distance from at least a portion of the at least one camera exposed to the outside.

According to various embodiments, the lens frame may comprise a first part receiving at least a portion of the first transparent member, a second part receiving at least a portion of the second transparent member, and a third part connecting the first part with the second part.

According to various embodiments, the at least one camera may comprise a plurality of first cameras disposed on the first part and the second part. The at least one first transmission coil may be disposed adjacent to at least one of the plurality of first cameras.

According to various embodiments, the at least one camera may comprise one or more third cameras disposed on the third part. The at least one first transmission coil may be disposed adjacent to at least one of the one or more third cameras.

According to various embodiments, the electronic device may further comprise at least one second transmission coil disposed in the lens frame to surround the at least one of the first transparent member and the second transparent member as viewed in a direction. The power transmission circuit may be further configured to transfer a current to the at least one second transmission coil.

According to various embodiments, the power transmission circuit may be disposed on at least one of the one or more wearing members.

According to various embodiments, the electronic device may further comprise at least one hall sensor disposed on the lens frame.

According to various embodiments, the at least one hall sensor may be disposed adjacent to at least a portion of the at least one camera exposed to the outside.

According to various embodiments, the electronic device may further comprise at least one processor disposed on the wearing member. The at least one processor may be configured to identify whether the external electronic device is attached to the lens frame using the at least one hall sensor.

According to various embodiments, the electronic device may further comprise at least one processor disposed on the wearing members. The at least one processor may be configured to control the power transmission circuit to transfer the current to the at least one first transmission coil if the attachment of the external electronic device to the lens frame is identified.

According to various embodiments, the electronic device may further comprise at least one processor disposed on the wearing members. The at least one processor may be configured to control the power transmission circuit to stop the transfer of the current to the at least one first transmission coil if detachment of the external electronic device from the lens frame is identified.

According to various embodiments, the electronic device may further comprise at least one processor and a communication circuit disposed on the wearing members. The at least one processor may be configured to identify position information where the at least one object is displayed, and transmit, to the external electronic device, control information for controlling the external electronic device to adjust a transmittance of at least a partial area of the at least one color-changeable lens, through the communication circuit, based on the position information. The control information may comprise information indicating at least the partial area whose transmittance is to be adjusted.

According to various embodiments, at least the partial area of the at least one color-changeable lens may overlap the area where the at least one object is displayed in at least one of the first transparent member or the second transparent member as viewed in a direction.

According to various embodiments, the electronic device may further comprise at least one processor disposed on the wearing member. The at least one processor may be configured to identify an external illuminance using at least one sensor or the at least one camera and control the power transmission circuit to transfer the current to the at least one first transmission coil based on the identified external illuminance.

According to various embodiments, the at least one processor may be further configured to, if the identified external illuminance is identified to be less than a threshold, allow the external electronic device to transmit information to cause the transmittance of at least the partial area of the at least one color-changeable lens to increase.

According to various embodiments, the at least one processor may be further configured to, if the identified external illuminance is identified to be not less than the threshold, allow the external electronic device to transmit information to cause the transmittance of at least the partial area of the at least one color-changeable lens to decrease.

According to various embodiments, the at least one processor may be further configured to determine a length of duration during which the current is transferred to the at least one first transmission coil, based on the identified external illuminance.

According to various embodiments, the at least one processor may be configured to control the power transmission circuit to transfer the current to the at least one first transmission coil during the determined length of duration, every designated period.

According to various embodiments, the at least one color-changeable lens may be included in the first transparent member and second transparent member.

According to various embodiments, the at least one color-changeable lens may further include a first electrode, a second electrode, and a plurality of layers.

According to various embodiments, the first electrode and the second electrode each may include a transparent electrode. The first electrode and the second electrode may be formed of an indium tin oxide (ITO) electrode.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first transparent member and a second transparent member where at least one visual object is displayed;
a lens frame receiving at least a portion of the first transparent member and at least a portion of the second transparent member, the lens frame configured to:
allow an external electronic device, which includes at least one color-changeable lens and at least one reception coil configured to receive power from the electronic device and to transmit the received power to at least one color-changeable lens, to be detachably attached to the electronic device, and
allow the at least one color-changeable lens to be aligned with at least one of the first transparent member or the second transparent member when the external electronic device is attached to the lens frame;
one or more wearing members extending from the lens frame or coupled to the lens frame;
a driving circuit including a first driving circuit and a second driving circuit, disposed on the wearing member and configured to apply voltage to the at least one color-changeable lens;
at least one camera disposed in the lens frame and at least partially exposed to an outside through at least one hole formed in the lens frame;
at least one first transmission coil disposed adjacent to at least a portion of the at least one camera inside the lens frame, to be aligned with at least one reception coil and transmit power to the reception coil; and
a power transmission circuit configured to transfer a current to the at least one first transmission coil,
wherein the at least one color-changeable lens includes a plurality of first transparent electrodes that are configured to receive a voltage from the first driving circuit and a plurality of second electrodes that are configured to receive a voltage from the second driving circuit,
wherein the plurality of first transparent electrodes and the plurality of second transparent electrodes are disposed to cross each other,
wherein the color-changeable lens is configured such that a transmittance at an intersection between one of the first transparent electrode and one of the second transparent electrode, which receive voltages from the first driving circuit and the second driving circuit, respectively, changes according to a magnitude of the applied voltages, and
wherein the transmittance of a partial area corresponding to a position at which a visual object is displayed is decreased or increased based on an ambient environment.

2. The electronic device of claim 1, wherein the at least one first transmission coil is disposed to surround the at least one hole as viewed in a direction.

3. The electronic device of claim 1, wherein the at least one first transmission coil is disposed within a designated distance from at least a portion of the at least one camera exposed to the outside.

4. The electronic device of claim 1, wherein the lens frame comprises:
a first part receiving at least a portion of the first transparent member;
a second part receiving at least a portion of the second transparent member; and
a third part connecting the first part with the second part.

5. The electronic device of claim 4,
wherein the at least one camera comprises a plurality of first cameras disposed on the first part and the second part, and
wherein the at least one first transmission coil is disposed adjacent to at least one of the plurality of first cameras.

6. The electronic device of claim 4,
wherein the at least one camera comprises one or more third cameras disposed on the third part, and
wherein the at least one first transmission coil is disposed adjacent to at least one of the one or more third cameras.

7. The electronic device of claim 1, further comprising:
at least one second transmission coil disposed in the lens frame to surround the at least one of the first transparent member and the second transparent member as viewed in a direction,
wherein the power transmission circuit is further configured to transfer a current to the at least one second transmission coil.

8. The electronic device of claim 1, wherein the power transmission circuit is disposed on at least one of the one or more wearing members.

9. The electronic device of claim 1, further comprising:
at least one hall sensor disposed on the lens frame.

10. The electronic device of claim 9, wherein the at least one hall sensor is disposed adjacent to at least a portion of the at least one camera exposed to the outside.

11. The electronic device of claim 9, further comprising:
at least one processor disposed on the wearing members,
wherein the at least one processor is configured to identify whether the external electronic device is attached to the lens frame using the at least one hall sensor.

12. The electronic device of claim 1, further comprising:
at least one processor disposed on the wearing member,
wherein the at least one processor is configured to control the power transmission circuit to transfer the current to the at least one first transmission coil if the attachment of the external electronic device to the lens frame is identified.

13. The electronic device of claim 1, further comprising at least one processor disposed on the wearing members,
wherein the at least one processor is configured to control the power transmission circuit to stop the transfer of the current to the at least one first transmission coil if detachment of the external electronic device from the lens frame is identified.

14. The electronic device of claim 1, further comprising:
at least one processor and a communication circuit disposed on the wearing member,
wherein the at least one processor is configured to:
identify position information where the at least one object is displayed, and
transmit, to the external electronic device, control information for controlling the external electronic device to adjust a transmittance of at least a partial area of the at least one color-changeable lens, through the communication circuit, based on the position information, and
wherein the control information comprises information indicating at least the partial area whose transmittance is to be adjusted.

15. The electronic device of claim 14, wherein at least the partial area of the at least one color-changeable lens overlaps the area where the at least one object is displayed in at least one of the first transparent member or the second transparent member as viewed in a direction.

16. The electronic device of claim 1, further comprising:
at least one processor disposed on the wearing member,
wherein the at least one processor is configured to:
identify an external illuminance using at least one sensor or the at least one camera, and
control the power transmission circuit to transfer the current to the at least one first transmission coil based on the identified external illuminance.

17. The electronic device of claim 16, wherein the at least one processor is further configured to, if the identified external illuminance is identified to be less than a threshold, allow the external electronic device to transmit information to cause a transmittance of at least a partial area of the at least one color-changeable lens to increase.

18. The electronic device of claim 16, wherein the at least one processor is further configured to, if the identified external illuminance is identified to be not less than a threshold, allow the external electronic device to transmit information to cause a transmittance of at least a partial area of the at least one color-changeable lens to decrease.

19. The electronic device of claim 16, wherein the at least one processor is further configured to determine a length of duration during which the current is transferred to the at least one first transmission coil, based on the identified external illuminance.

20. The electronic device of claim 19, wherein the at least one processor is configured to control the power transmission circuit to transfer the current to the at least one first transmission coil during the determined length of duration, every designated period.

* * * * *